United States Patent
Liu et al.

(10) Patent No.: US 10,567,061 B2
(45) Date of Patent: *Feb. 18, 2020

(54) METHOD FOR FEEDING BACK CHANNEL STATE INFORMATION AND AN APPARATUS

(71) Applicant: Huawei Technologies Co., Ltd., Shenzhen (CN)

(72) Inventors: Jianqin Liu, Beijing (CN); Jianghua Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/829,206

(22) Filed: Dec. 1, 2017

(65) Prior Publication Data

US 2018/0091209 A1 Mar. 29, 2018

Related U.S. Application Data

(63) Continuation of application No. 15/160,919, filed on May 20, 2016, now Pat. No. 9,838,106, which is a
(Continued)

(51) Int. Cl.
*H04B 7/06* (2006.01)
*H04B 7/0417* (2017.01)
(Continued)

(52) U.S. Cl.
CPC ......... *H04B 7/0639* (2013.01); *H04B 7/0417* (2013.01); *H04B 7/065* (2013.01);
(Continued)

(58) Field of Classification Search
CPC .. H04B 7/0639; H04B 7/0626; H04B 7/0417; H04W 72/0413; H04W 72/0446
See application file for complete search history.

(56) References Cited

U.S. PATENT DOCUMENTS

| 8,184,544 B2 | 5/2012 | Ko et al. |
| 8,611,243 B2 | 12/2013 | Ko et al. |

(Continued)

FOREIGN PATENT DOCUMENTS

| CN | 102291218 A | 12/2011 |
| CN | 102938688 A | 2/2013 |

(Continued)

OTHER PUBLICATIONS

3rd Generation Partnership Project; Technical Specification Group Radio Access Network; Evolved Universal Terrestrial Radio Access (E-UTRA);Physical Channels and Modulation(Release 10), Technical Specification, 3GPP TS 36.211 V10.3.0, (Sep. 2011), 103 pages.

(Continued)

*Primary Examiner* — Jean B Corrielus
(74) *Attorney, Agent, or Firm* — Slater Matsil, LLP

(57) ABSTRACT

The present application discloses a method for feeding back channel state information (CSI), comprising: acquiring first and second CSI based on a first and a second CSI measurement resource respectively, obtaining a channel quality indicator (CQI) based on the first CSI and the second CSI, wherein the first CSI comprises a first and a second type of precoding matrix indicator (PMI1 and PMI2) and a first rank indicator (RI1), and the second CSI comprises a first and a second type of PMI (PMI3 and PMI4) and a second RI (RI2); and feeding back third CSI to a base station, wherein the third CSI comprises third PMI information, third RI information, and the CQI, wherein the third PMI information is obtained based on at least three of the PMI1, the PMI2, the PMI3, and the PMI4, and the third RI information is obtained based on the RI1 and the RI2.

8 Claims, 3 Drawing Sheets

Related U.S. Application Data continuation of application No. PCT/CN2013/087728, filed on Nov. 22, 2013.

(51) Int. Cl.
  *H04W 72/04* (2009.01)
  *H04L 1/00* (2006.01)

(52) U.S. Cl.
  CPC ...... *H04B 7/0626* (2013.01); *H04W 72/0413* (2013.01); *H04W 72/0446* (2013.01); *H04L 1/0026* (2013.01)

(56) References Cited

U.S. PATENT DOCUMENTS

| | | | |
|---|---|---|---|
| 8,639,198 B2 | 1/2014 | Liu et al. | |
| 8,781,005 B2 | 7/2014 | Mallik et al. | |
| 9,100,870 B2* | 8/2015 | Yang | H04B 7/0626 |
| 9,148,818 B2 | 9/2015 | Yue et al. | |
| 2011/0237282 A1 | 9/2011 | Geirhofer et al. | |
| 2012/0063500 A1* | 3/2012 | Wang | H04L 1/0026 |
| | | | 375/224 |
| 2012/0219042 A1 | 8/2012 | Onggosanusi et al. | |
| 2013/0021980 A1* | 1/2013 | Yang | H04B 7/0626 |
| | | | 370/328 |
| 2013/0089064 A1 | 4/2013 | Ding et al. | |
| 2013/0258964 A1* | 10/2013 | Nam | H04W 72/046 |
| | | | 370/329 |
| 2013/0308714 A1* | 11/2013 | Xu | H04B 7/0417 |
| | | | 375/267 |
| 2013/0308715 A1 | 11/2013 | Nam et al. | |
| 2014/0079100 A1 | 3/2014 | Kim et al. | |
| 2014/0192762 A1 | 7/2014 | Li et al. | |
| 2014/0192917 A1* | 7/2014 | Nam | H04B 7/0417 |
| | | | 375/267 |
| 2014/0247749 A1* | 9/2014 | Kim | H04B 7/024 |
| | | | 370/252 |
| 2014/0313976 A1 | 10/2014 | Tian et al. | |
| 2015/0016288 A1 | 1/2015 | Maattanen et al. | |
| 2015/0036610 A1* | 2/2015 | Kim | H04B 7/0626 |
| | | | 370/329 |
| 2015/0341092 A1* | 11/2015 | Park | H04B 7/0469 |
| | | | 370/329 |
| 2016/0056875 A1* | 2/2016 | Kang | H04B 7/0456 |
| | | | 370/329 |
| 2016/0204842 A1* | 7/2016 | Song | H04L 1/0029 |
| | | | 375/267 |
| 2016/0204845 A1* | 7/2016 | Kim | H04B 7/0417 |
| | | | 370/329 |
| 2016/0254891 A1 | 9/2016 | Yoon et al. | |
| 2017/0257156 A1* | 9/2017 | Ko | H04L 1/0026 |

FOREIGN PATENT DOCUMENTS

| | | |
|---|---|---|
| CN | 103178888 A | 6/2013 |
| CN | 103209012 A | 7/2013 |
| GB | 201300964 | 3/2013 |
| WO | 2013024350 A2 | 2/2013 |
| WO | WO-2015042986 A1 * | 4/2015 ........... H04L 1/0029 |

OTHER PUBLICATIONS

3rd Generation Partnership Project;Technical Specification Group Radio Access Network; Evolved Universal Terrestrial Radio Access (E-UTRA);Physical layer procedures(Release 10), Technical Specification, 3GPP TS 36.213 V10.3.0 (Sep. 2011), 122 pages.

* cited by examiner

METHOD FOR FEEDING BACK CHANNEL STATE INFORMATION AND AN APPARATUS

CROSS-REFERENCE TO RELATED APPLICATIONS

This application is a continuation of U.S. patent application Ser. No. 15/160,919, filed on May 20, 2016, now U.S. Pat. No. 9,838,106, which is a continuation of International Application No. PCT/CN2013/087728, filed on Nov. 22, 2013. All of the afore-mentioned patent applications are hereby incorporated by reference in their entireties.

TECHNICAL FIELD

The present application relates to the field of mobile communications technologies, and in particular, to a method for feeding back channel state information and an apparatus.

BACKGROUND

In a wireless communications system, a transmit end and a receive end acquire higher rates by using multiple antennas by means of spatial multiplexing. Compared with general spatial multiplexing methods, an enhanced technology is that the receive end feeds back channel information to the transmit end, and the transmit end uses some transmission precoding technologies according to the obtained channel information, which greatly improves transmission performance.

In a Long Term Evolution (LTE) system, to implement effective control and scheduling of different user equipments (UE) for a base station, the UEs need to feed back some channel state information (CSI) to the base station by using an uplink channel, where this channel state information may include a channel quality indicator (CQI), a precoding matrix indicator (PMI), and a rank indicator (RI).

In 3rd Generation Partnership Project release-12 (3GPP Rel-12) of LTE, an antenna scale is extended from a horizontal linear array into a horizontal-vertical two-dimensional planar array (that is, a common active antenna system (AAS)), and a quantity of antennas also further increases from a maximum quantity of 8 in 3GPP Rel-11 to 16, 32, and 64. As the antenna scale increases, complexity of corresponding CSI measurement and feedback also correspondingly increases, and there is no specific technical solutions applicable to the foregoing large-scale planar antenna array in the prior art. If only a method for CSI measurement and feedback in 3GPP Rel-11 is simply extended, measurement and feedback overheads are heavy, and a waste of uplink channel resources is caused.

SUMMARY

Embodiments of the present application provide a method for feeding back channel state information and an apparatus, to reduce overheads of feeding back channel state information.

According to a first aspect, a feedback method of channel state information is provided. The method includes: acquiring, by user equipment, first channel state information based on a first channel state information measurement resource configured by a base station, and acquiring second channel state information based on a second channel state information measurement resource configured by the base station. The first channel state information measurement resource and the second channel state information measurement resource respectively correspond to a first antenna port representing a horizontal dimension and a second antenna port representing a vertical dimension. The method also includes feeding back, by the user equipment, channel state information to the base station, which includes: feeding back, by the user equipment, the first channel state information to the base station according to a first feedback mode, and feeding back the second channel state information to the base station according to a second feedback mode, where the second feedback mode is different from the first feedback mode; or feeding back, by the user equipment, third channel state information according to a third feedback mode, where the third channel state information is obtained by the user equipment based on the first channel state information and the second channel state information.

With reference to the first aspect, in a first possible implementation manner, the first channel state information includes first precoding matrix indicator information, the second channel state information includes second precoding matrix indicator information, and the second feedback mode being different from the first feedback mode includes: a frequency domain feedback granularity of the first precoding matrix indicator information is less than or equal to a frequency domain feedback granularity of the second precoding matrix indicator information.

With reference to the first aspect or the first possible implementation manner of the first aspect, in a second possible implementation manner, the second feedback mode being different from the first feedback mode includes: a feedback cycle of the first channel state information is less than a feedback cycle of the second channel state information.

With reference to any possible implementation manner of the first aspect to the second possible implementation manner of the first aspect, in a third possible implementation manner, the first channel state information includes the first precoding matrix indicator information and first rank indicator information RI1, and the second channel state information includes the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4; and the user equipment obtains a channel quality indicator CQI based on the first channel state information and the second channel state information; and the channel state information that is fed back by the user equipment to the base station includes: the first channel state information, the second channel state information, and the CQI; or third precoding matrix indicator information, third rank indicator information, and the CQI, where the third precoding matrix indicator information is obtained based on at least three of the PMI1, the PMI2, the PMI3, and the PMI4, and the third rank indicator information is obtained based on the RI1 and the RI2.

With reference to the third possible implementation manner of the first aspect, in a fourth possible implementation manner, the user equipment feeds back the channel state information to the base station by using a physical uplink control channel PUCCH, and the feeding back, by the user equipment, the channel state information to the base station includes: feeding back the channel state information in one channel state information feedback cycle of the physical uplink control channel PUCCH, where the one channel state information feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the RI1, the RI2, and the PMI1 are fed back in a first feedback timeslot; the PMI2, the PMI3, and the CQI are fed back in a second feedback timeslot; and the PMI2, the PMI3, and the CQI are fed back in a third feedback timeslot; or the RI1, the RI2, the PMI1, and the PMI3 are fed back in a first feedback timeslot; the PMI2, the PMI4, and the CQI are fed back in a second feedback timeslot; and the PMI2, the PMI4, and the CQI are fed back in a third feedback timeslot.

With reference to the third possible implementation manner of the first aspect, in a fifth possible implementation manner, the user equipment feeds back the channel state information to the base station by using a physical uplink control channel PUCCH, and the feeding back, by the user equipment, the channel state information to the base station includes: feeding back the channel state information in one channel state information CSI feedback cycle of the physical uplink control channel PUCCH, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the CSI feedback cycle includes three feedback timeslots, where: the RI1 and the RI2 are fed back in a first feedback timeslot; the PMI1, the PMI2, the PMI3, and the CQI are fed back in a second feedback timeslot; and the PMI1, the PMI2, the PMI3, and the CQI are fed back in a third feedback timeslot.

With reference to the third possible implementation manner of the first aspect, in a sixth possible implementation manner, the channel state information further includes a precoding matrix type indicator PTI indicating a type of a precoding matrix, and when the precoding matrix is of a first type, that the user equipment feeds back the channel state information to the base station by using a physical uplink control channel PUCCH includes: feeding back the channel state information in one channel state information CSI feedback cycle of the physical uplink control channel PUCCH, where the CSI feedback cycle includes five feedback timeslots, and content fed back in the timeslots is shown as options in the following table:

|  | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 0 | PMI1 + PMI2 | PMI3wb + CQIwb | PMI3wb + CQIwb | PMI3wb + CQIwb | RI1 + RI2 PTI = 0 |
| Option 2 | RI1 + RI2 PTI = 0 | PMI1 | PMI2 + PMI3wb + CQIwb | PMI2 + PMI3wb + CQIwb | PMI2 + PMI3wb + CQIwb | RI1 + RI2 PTI = 0 |
| Option 3 | RI1 PTI = 0 | PMI1 + RI2 | PMI2 + PMI3wb + CQIwb | PMI2 + PMI3wb + CQIwb | PMI2 + PMI3wb + CQIwb | RI1 PTI = 0 |
| Option 4 | RI2 PTI = 0 | PMI1 + RI1 | PMI2 + PMI3wb + CQIwb | PMI2 + PMI3wb + CQIwb | PMI2 + PMI3wb + CQIwb | RI2 PTI = 0 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the first type; and the feedback timeslots correspond to feedback moments within one CSI feedback cycle.

With reference to the third possible implementation manner of the first aspect, in a seventh possible implementation manner, the channel state information further includes a precoding matrix type indicator PTI indicating a type of a precoding matrix, and when the precoding matrix is of a second type, that the user equipment feeds back the channel state information to the base station by using a physical uplink control channel PUCCH includes: feeding back the channel state information in one channel state information CSI feedback cycle of the physical uplink control channel PUCCH, where the CSI feedback cycle includes five feedback timeslots, and content fed back in the timeslots is shown as options in the following table:

|  | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 1 | PMI1 + PMI2 + CQIwb | PMI3sb + CQIsb | PMI3sb + CQIsb | PMI3sb + CQIsb | RI1 + RI2 PTI = 1 |
| Option 2 | RI2 + PMI2 PTI = 1 | PMI1 + RI1 CQIwb | PMI3sb + CQIsb | PMI3sb + CQIsb | PMI3sb + CQIsb | RI2 + PMI2 PTI = 1 |
| Option 3 | RI2 + PMI2 PTI = 1 | PMI1 + RI1 CQIwb | PMI3sb + PMI4sb + CQIsb | PMI3sb + PMI4sb + CQIsb | PMI3sb + PMI4sb + CQIsb | RI2 + PMI2 PTI = 1 |
| Option 4 | RI2 PTI = 1 | PMI1 + RI1 CQIwb | PMI3sb + PMI2 + CQIsb | PMI3sb + PMI2 + CQIsb | PMI3sb + PMI2 + CQIsb | RI2 PTI = 1 |
| Option 5 | RI2 + RI1 PTI = 1 | PMI1 + CQIwb | PMI3sb + PMI2 + CQIsb | PMI3sb + PMI2 + CQIsb | PMI3sb + PMI2 + CQIsb | RI2 + RI1 PTI = 1 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the second type; and the feedback timeslots correspond to feedback moments within one CSI feedback cycle.

According to a second aspect, user equipment is provided. The user equipment includes a processor, configured to acquire first channel state information based on a first channel state information measurement resource configured by a base station, and acquire second channel state information based on a second channel state information measurement resource configured by the base station, where the first channel state information measurement resource and the second channel state information measurement resource respectively correspond to a first antenna port representing a horizontal dimension and a second antenna port representing a vertical dimension. The user equipment also includes a sender, configured to feed back channel state information to the base station, which includes: the sender is configured to feed back the first channel state information to the base station according to a first feedback mode, and feed back the second channel state information to the base station according to a second feedback mode, where the second feedback mode is different from the first feedback mode; or the sender is configured to feed back third channel state information according to a third feedback mode, where the third channel state information is obtained by the processor based on the first channel state information and the second channel state information.

With reference to the second aspect, in a first possible implementation manner, the first channel state information includes first precoding matrix indicator information, the second channel state information includes second precoding matrix indicator information, and when the sender feeds back the channel state information, a frequency domain feedback granularity of the first precoding matrix indicator information is less than or equal to a frequency domain feedback granularity of the second precoding matrix indicator information.

With reference to the second aspect or the first possible implementation manner of the second aspect, in a second possible implementation manner, when the sender feeds back the channel state information, a feedback cycle of the first channel state information is less than a feedback cycle of the second channel state information.

With reference to any possible implementation manner of the second aspect to the second possible implementation manner of the second aspect, in a third possible implementation manner, the first channel state information includes the first precoding matrix indicator information and first rank indicator information RI1, and the second channel state information includes the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4; and the processor obtains a channel quality indicator CQI based on the first channel state information and the second channel state information; and the channel state information that is fed back by the sender to the base station includes the first channel state information, the second channel state information, and the CQI; or third precoding matrix indicator information, third rank indicator information, and the CQI, where the third precoding matrix indicator information is obtained based on at least three of the PMI1, the PMI2, the PMI3, and the PMI4, and the third rank indicator information is obtained based on the RI1 and the RI2.

With reference to the third possible implementation manner of the second aspect, in a fourth possible implementation manner, the user equipment feeds back the channel state information to the base station by using a physical uplink control channel PUCCH, and the transmitter feeds back the channel state information in one channel state information CSI feedback cycle of the physical uplink control channel PUCCH, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the RI1, the RI2, and the PMI1 are fed back in a first feedback timeslot; the PMI2, the PMI3, and the CQI are fed back in a second feedback timeslot; and the PMI2, the PMI3, and the CQI are fed back in a third feedback timeslot; or the RI1, the RI2, the PMI1, and the PMI3 are fed back in a first feedback timeslot; the PMI2, the PMI4, and the CQI are fed back in a second feedback timeslot; and the PMI2, the PMI4, and the CQI are fed back in a third feedback timeslot.

With reference to the third possible implementation manner of the second aspect, in a fifth possible implementation manner, the user equipment feeds back the channel state information to the base station by using a physical uplink control channel PUCCH, and the transmitter feeds back the channel state information in one channel state information CSI feedback cycle of the physical uplink control channel PUCCH, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the CSI feedback cycle includes three feedback timeslots, where: the RI1 and the RI2 are fed back in a first feedback timeslot; the PMI1, the PMI2, the PMI3, and the CQI are fed back in a second feedback timeslot; and the PMI1, the PMI2, the PMI3, and the CQI are fed back in a third feedback timeslot.

With reference to the third possible implementation manner of the second aspect, in a sixth possible implementation manner, the channel state information further includes a precoding matrix type indicator PTI indicating a type of a precoding matrix, and when the precoding matrix is of a first type, the user equipment feeds back the channel state information to the base station by using a physical uplink control channel PUCCH, and the transmitter feeds back the channel state information in one channel state information CSI feedback cycle of the physical uplink control channel PUCCH, where the CSI feedback cycle includes five feedback timeslots, and content fed back in the timeslots is shown as options in the following table:

| | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 0 | PMI1 + PMI2 | PMI3wb + CQIwb | PMI3wb + CQIwb | PMI3wb + CQIwb | RI1 + RI2 PTI = 0 |
| Option 2 | RI1 + RI2 PTI = 0 | PMI1 | PMI2 + PMI3wb + CQIwb | PMI2 + PMI3wb + CQIwb | PMI2 + PMI3wb + CQIwb | RI1 + RI2 PTI = 0 |
| Option 3 | RI1 PTI = 0 | PMI1 + RI2 | PMI2 + PMI3wb + CQIwb | PMI2 + PMI3wb + CQIwb | PMI2 + PMI3wb + CQIwb | RI1 PTI = 0 |
| Option 4 | RI2 PTI = 0 | PMI1 + RI1 | PMI2 + PMI3wb + CQIwb | PMI2 + PMI3wb + CQIwb | PMI2 + PMI3wb + CQIwb | RI2 PTI = 0 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the first type; and the feedback timeslots correspond to feedback moments within one CSI feedback cycle.

With reference to the third possible implementation manner of the second aspect, in a seventh possible implementation manner, the channel state information further includes a precoding matrix type indicator PTI indicating a type of a precoding matrix, and when the precoding matrix is of a second type, the user equipment feeds back the channel state information to the base station by using a physical uplink control channel PUCCH, and the transmitter feeds back the channel state information in one channel state information CSI feedback cycle of the physical uplink control channel PUCCH, where the CSI feedback cycle includes five feedback timeslots, and content fed back in the timeslots is shown as options in the following table:

|  | First feedback timeslot | Second feedback timeslot | Third feedback timeslot | Fourth feedback timeslot | Fifth feedback timeslot | Sixth feedback timeslot |
| --- | --- | --- | --- | --- | --- | --- |
| Option 1 | RI1 + RI2 PTI = 1 | PMI1 + PMI2 + CQIwb | PMI3sb + CQIsb | PMI3sb + CQIsb | PMI3sb + CQIsb | RI1 + RI2 PTI = 1 |
| Option 2 | RI2 + PMI2 PTI = 1 | PMI1 + RI1 CQIwb | PMI3sb + CQIsb | PMI3sb + CQIsb | PMI3sb + CQIsb | RI2 + PMI2 PTI = 1 |
| Option 3 | RI2 + PMI2 PTI = 1 | PMI1 + RI1 CQIwb | PMI3sb + PMI4sb + CQIsb | PMI3sb + PMI4sb + CQIsb | PMI3sb + PMI4sb + CQIsb | RI2 + PMI2 PTI = 1 |
| Option 4 | RI2 PTI = 1 | PMI1 + RI1 CQIwb | PMI3sb + PMI2 + CQIsb | PMI3sb + PMI2 + CQIsb | PMI3sb + PMI2 + CQIsb | RI2 PTI = 1 |
| Option 5 | RI2 + RI1 PTI = 1 | PMI1 + CQIwb | PMI3sb + PMI2 + CQIsb | PMI3sb + PMI2 + CQIsb | PMI3sb + PMI2 + CQIsb | RI2 + RI1 PTI = 1 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the second type; and the feedback timeslots correspond to feedback moments within one CSI feedback cycle.

According to a third aspect, a method for measuring channel state information is provided. The method includes configuring, by a base station, a first channel state information measurement resource and a second channel state information measurement resource, and sending the first channel state information measurement resource and the second channel state information measurement resource to user equipment, so that the user equipment acquires first channel state information according to the first channel state information measurement resource, and acquires second channel state information according to the second channel state information measurement resource, where the first channel state information measurement resource and the second channel state information measurement resource respectively correspond to a first antenna port representing a horizontal dimension and a second antenna port representing a vertical dimension. The method also includes receiving channel state information that is fed back by the user equipment, which includes: receiving the first channel state information that is fed back by the user equipment according to a first feedback mode, and the second channel state information that is fed back by the user equipment according to a second feedback mode, where the second feedback mode is different from the first feedback mode; or receiving third channel state information that is fed back by the user equipment according to a third feedback mode, where the third channel state information is obtained by the user equipment based on the first channel state information and the second channel state information.

With reference to the third aspect, in a third possible implementation manner, the first channel state information includes first precoding matrix indicator information, the second channel state information includes second precoding matrix indicator information, and the second feedback mode being different from the first feedback mode includes: a frequency domain feedback granularity of the first precoding matrix indicator information is less than or equal to a frequency domain feedback granularity of the second precoding matrix indicator information.

With reference to the third aspect or the first possible implementation manner of the third aspect, in a second possible implementation manner, the second feedback mode being different from the first feedback mode includes: a feedback cycle of the first channel state information is less than a feedback cycle of the second channel state information.

With reference to any possible implementation manner of the third aspect to the second possible implementation manner of the third aspect, in a third possible implementation manner, the first channel state information includes the first precoding matrix indicator information and first rank indicator information RI1, and the second channel state information includes the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4; and the received channel state information fed back by the user equipment includes: the first channel state information, the second channel state information, and a channel quality indicator CQI; or third precoding matrix indicator information, third rank indicator information, and a CQI, where: the third precoding matrix indicator information is obtained based on at least three of the PMI1, the PMI2, the PMI3, and the PMI4; the third rank indicator information is obtained based on the RI1 and the RI2; and the channel quality indicator CQI is obtained by the user equipment based on the first channel state information and the second channel state information.

According to a fourth aspect, a base station is provided. The base station includes: a base station processor, adapted to configure a first channel state information measurement resource and a second channel state information measurement resource, and send the first channel state information measurement resource and the second channel state information measurement resource to user equipment, so that the user equipment acquires first channel state information according to the first channel state information measurement resource, and acquires second channel state information according to the second channel state information measurement resource, where the first channel state information measurement resource and the second channel state information measurement resource respectively correspond to a first antenna port representing a horizontal dimension and a second antenna port representing a vertical dimension. The base station also includes a receiver, configured to receive channel state information fed back by the user equipment, which includes: the receiver is configured to receive the first channel state information that is fed back by the user equipment according to a first feedback mode, and the second channel state information that is fed back by the user equipment according to a second feedback mode, where the second feedback mode is different from the first feedback mode; or the receiver is configured to receive third channel state information that is fed back by the user equipment according to a third feedback mode, where the third channel state information is obtained by the user equipment based on the first channel state information and the second channel state information.

With reference to the fourth aspect, in a first possible implementation manner, the first channel state information includes first precoding matrix indicator information, the second channel state information includes second precoding matrix indicator information, and in the channel state information received by the receiver, a frequency domain feedback granularity of the first precoding matrix indicator information is less than or equal to a frequency domain feedback granularity of the second precoding matrix indicator information.

With reference to the fourth aspect or the first possible implementation manner of the fourth aspect, in a second possible implementation manner, the receiver is further configured to receive the channel state information according to a principle that a feedback cycle of the first channel state information is less than a feedback cycle of the second channel state information.

With reference to any possible implementation manner of the fourth aspect to the second possible implementation manner of the fourth aspect, in a third possible implementation manner, the first channel state information includes the first precoding matrix indicator information and first rank indicator information RI1, and the second channel state information includes the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4; and the receiver is configured to receive the first channel state information, the second channel state information, and a channel quality indicator CQI; or third precoding matrix indicator information, third rank indicator information, and a CQI, where: the third precoding matrix indicator information is obtained based on at least three of the PMI1, the PMI2, the PMI3, and the PMI4; the third rank indicator information is obtained based on the RI1 and the RI2; and the channel quality indicator CQI is obtained by the user equipment based on the first channel state information and the second channel state information.

By means of the feedback method and apparatus of channel state information that are provided in the present application, according to a characteristic that a vertical-direction channel change feature is different from a horizontal-direction channel change feature, simplified design and feedback that are different from design and feedback of horizontal-direction channel state information are made for vertical-direction channel state information in a dimension of a frequency domain or a time domain, thereby achieving an objective of reducing feedback overheads in the frequency domain or the time domain.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
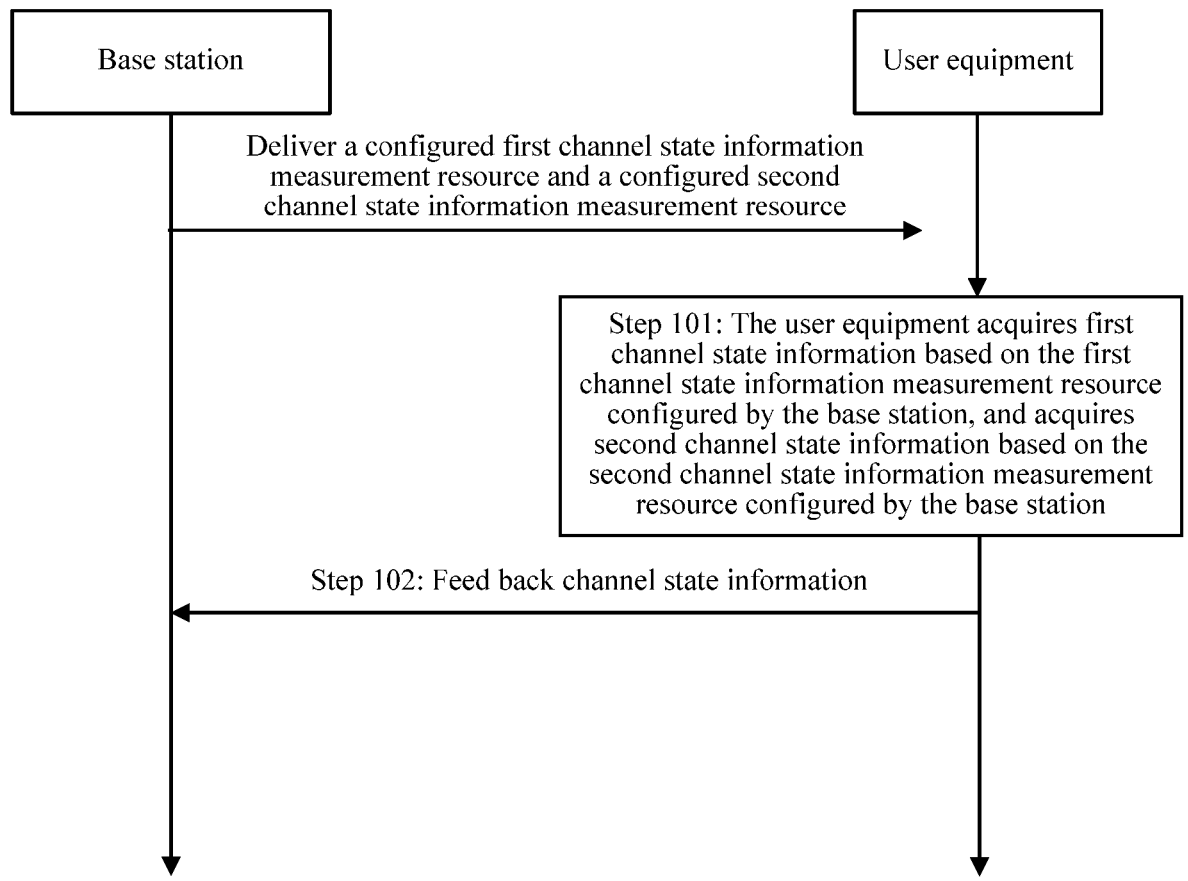
FIG. 1 is a schematic flowchart of a feedback method of channel state information according to an embodiment of the present application.

To make the objectives, technical solutions, and advantages of the embodiments of the present application clearer, the following describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

It should be understood that the technical solutions of the embodiments of the present application may be applied to various communications systems, such as: a Global System for Mobile Communications ("GSM" for short), a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short) system, and a Universal Mobile Telecommunications System ("UMTS" for short).

It should also be understood that in the embodiments of the present application, user equipment (UE) may be referred to as a terminal, a mobile station (MS), a mobile terminal, and the like. The user equipment may communicate with one or more core networks by using a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present application, a base station may be a base station (Base Transceiver Station, "BTS" for short) in the GSM, may also be a base station (NodeB, "NB" for short) in the WCDMA, and may further be an evolved NodeB (Evolutional Node B, "eNB" or "e-NodeB" for short) in the LTE, which is not limited in the present application.

A closed-loop precoding technology is introduced into a system of LTE Rel-8 and systems whose releases are higher than Rel-8 (including Rel-9, 10, 11 and 12, and even a higher release), and the closed-loop precoding technology first requires that both a base station and a terminal save a same precoding matrix set, which is referred to as a codebook. After estimating channel information according to a common pilot of a cell or a user-specific pilot, the terminal selects a precoding matrix from the codebook according to a specific criterion. The terminal feeds back an index of the selected precoding matrix in the codebook to the base station by using an uplink channel, where the index is marked as a PMI. The base station may determine, according to a received index value, a precoding matrix that should be used for the terminal. In addition, to help the base station implement link adaptation, the terminal needs to report channel quality indicator CQI according to a channel condition.

The PMI and the CQI that are obtained by means of calculation by the terminal are transmitted to the base station by using the uplink channel. The base station preprocesses a transmit end by using the PMI reported by the terminal, and performs link adaptation (including selection of a modulation scheme and an encoding rate, or the like) by using the CQI reported by the terminal.

In 3GPP Rel-12 of LTE, an antenna scale is extended from a horizontal linear array into a horizontal-vertical two-dimensional planar array, and a quantity of antennas also further increases from a maximum quantity of 8 of Rel-10 to 16, 32, and 64. As the antenna scale increases, complexity of corresponding CSI measurement and feedback also correspondingly increases. In a duplex mode, especially in frequency division duplex (FDD), a base station (BS) sends one or more sets of CSI-RS resources to user equipment (UE), and the UE performs, on each set of CSI-RS resources, CSI measurement on a port of a transmit array. As the antenna scale increases, the complexity of the corresponding CSI measurement and feedback also correspondingly increases. Time domain overheads and frequency domain overheads of the CSI measurement and feedback for a large quantity of antennas also increase exponentially, so that a dramatic increase in overheads of uplink channel resources overheads and a waste of uplink channel resources overheads are caused. There is no new feedback mode that is applicable to the foregoing large-scale planar antenna array and can reduce overheads in the prior art.

As shown in FIG. 1, the present application provides a feedback method of channel state information, which is applicable to a horizontal-vertical two-dimensional planar antenna array. The method includes the following steps.

Step 101: User equipment acquires first channel state information based on a first channel state information measurement resource configured by a base station, and acquires second channel state information based on a second channel state information measurement resource configured by the base station, where the first channel state information measurement resource and the second channel state information measurement resource respectively correspond to a first antenna port representing a horizontal dimension and a second antenna port representing a vertical dimension.

Step 102: The user equipment feeds back channel state information to the base station, where a specific feedback manner for feeding back the channel state information may be: feeding back, by the user equipment, the first channel state information to the base station according to a first feedback mode, and feeding back the second channel state information to the base station according to a second feedback mode, where the second feedback mode is different from the first feedback mode; or feeding back, by the user equipment, third channel state information according to a third feedback mode, where the third channel state information is obtained by the user equipment based on the first channel state information and the second channel state information.

It should be noted that an antenna port may be one physical transmit antenna, or may be a combination of multiple physical transmit antennas. A receiver of the user equipment does not decompose a signal that is from an antenna port in either of the two cases, because from the perspective of the user equipment, regardless of whether a channel is formed by a single physical transmit antenna or is formed by combining multiple physical transmit antennas, a reference signal (RS) corresponding to this antenna port defines this antenna port, and the user equipment may obtain channel estimation of this antenna port according to this reference signal in both of the cases. A specific reference signal is not limited in the present application, for example, may be a channel state information reference signal (CSI-RS).

In this embodiment of the present application, for a horizontal-vertical two-dimensional planar array, antenna ports may be separately defined with regard to a horizontal dimension and a vertical dimension. For example, it is assumed that the horizontal-vertical two-dimensional planar array is a two-dimensional planar antenna array with eight rows and four columns, and has 32 physical transmit antennas in total. If a CSI measurement and feedback mechanism in the prior art is directly extended, a possible technical solution is to define 32 antenna ports for the 32 physical transmit antennas, and correspondingly, the user equipment needs to perform CSI measurement and feedback for the 32 antenna ports. If the antenna ports are separately defined with regard to the horizontal dimension and the vertical dimension, for example, four first antenna ports are defined for the horizontal dimension, with each first antenna port corresponding to eight physical transmit antennas, eight second antenna ports are defined for the vertical dimension, with each second antenna port corresponding to four physical transmit antennas, and there are 12 antenna ports in total, then the user equipment needs to perform CSI measurement and feedback only for the 12 antenna ports, and approximately obtains channel state information corresponding to the 32 antenna ports. Therefore, measurement and feedback overheads can be reduced.

In addition, a horizontal-direction channel change feature is generally different from a vertical-direction channel change feature; therefore, when feeding back the channel state information to the base station, regarding different channel change features in a vertical direction and in a horizontal direction, the user equipment may further use different feedback modes for the first channel state information and the second channel state information, to achieve an objective of further reducing CSI feedback overheads.

In this embodiment of the present application, content of the first feedback mode, the second feedback mode, and the third feedback mode includes feedback granularities and feedback cycles in which the user terminal feeds back channel state information. The user equipment uses different feedback modes for the first channel state information and the second channel state information, which includes: a feedback cycle of the first channel state information is less than a feedback cycle of the second channel state information.

Optionally, the first channel state information includes first precoding matrix indicator information, the second channel state information includes second precoding matrix indicator information, and the second feedback mode being different from the first feedback mode may further include: a frequency domain feedback granularity of the first precoding matrix indicator information is less than or equal to a frequency domain feedback granularity of the second precoding matrix indicator information.

In this embodiment of the present application, because the channel state information fed back by the user equipment is independently measured in the vertical dimension and the horizontal dimension, channel state information in the two dimensions is separately obtained. Therefore, when specifically feeding back the channel state information, the user equipment may feed back the channel state information of the two dimensions to the base station in various combination manners. Therefore, a manner of feeding back the channel state information to the base station by the user equipment may be any one of the following manners:

Manner 1: The user equipment feeds back the first channel state information to the base station according to a first feedback mode, and feeds back the second channel state information to the base station according to a second feedback mode, where the second feedback mode is different from the first feedback mode, which may be specifically implemented as follows: in this example, the fed back channel state information including the first precoding matrix indicator information, first rank indicator information RI1, the second precoding matrix indicator information, second rank indicator information RI2, and channel quality indicator information CQI, where the channel quality indicator information CQI is obtained according to the first channel state information and the second channel state information. The CQI corresponds to a quantized value of channel quality (that is, a signal to noise ratio (Signal Interference Noise Ratio, SINR) based on CRS estimation) estimated pilot for the transmission of service data, and a signal power S of the SINR is obtained by means of calculation based on the first channel state information and the second channel state information of this cell.

Manner 2: The user equipment feeds back the third channel state information according to the third feedback mode, where the third channel state information is obtained by the user equipment based on the first channel state information and the second channel state information, which may be specifically implemented as follows: obtaining the third channel state information based on the first channel state information and the second channel state information, where the third channel state information includes third precoding matrix indicator information, the channel quality indicator information CQI, the RI1, and the RI2, or the third channel state information includes third precoding matrix indicator information, the channel quality indicator information CQI, and third rank indicator information RI that is obtained based on the RI1 and the RI2, and the third precoding matrix indicator information is further formed according to at least three of a PMI1, a PMI2, a PMI3, and a PMI4.

The third rank indicator information RI may be a product of the RI1 and the RI2. The third precoding matrix indicator information may be generated in any one of the following manners.

Manner 1: A relationship between a third precoding matrix PMI and the PMI1, the PMI2, the PMI3, and the PMI4 is: PMI=(PMI1×PMI2)⊗(PMI3×PMI4) or PMI=(PMI1×PMI2)⊗PMI3 or PMI=PMI1⊗(PMI3×PMI4), where ⊗ represents a Kronecker product (Kronecker product).

Manner 2: A relationship between the third precoding matrix PMI and the PMI1, the PMI2, the PMI3, and the PMI4 is: the PMI is a random combination of at least three of the PMI1, the PMI2, the PMI3, and the PMI4, for example, PMI=(PMI1, PMI2, PMI3).

In this embodiment of the present application, the channel state information may be fed back by using a physical uplink control channel (Physical Uplink Control CHannel, PUCCH) or a physical uplink shared channel (Physical Uplink Shared Channel, PUSCH). Therefore, the feedback method provided in the present application is described in detail below as two categories according to PUSCH feedback and PUCCH feedback:

Embodiment 1

The channel state information is fed back by using the PUSCH. In this embodiment of the present application, a frequency domain or time domain feedback granularity of vertical-direction channel state information is independent of horizontal-direction channel state information. Therefore, according to a characteristic that a vertical-direction channel changes slowly, the channel state information may be fed back in a manner that is different from a manner for feeding back horizontal-direction channel state information. During a specific application, independent and different design may be made according to a characteristic that a change of the vertical-direction channel is smaller than that of a horizontal-direction channel, that is, a vertical-direction frequency domain or time domain feedback granularity is different from a horizontal-direction frequency domain or time domain feedback granularity.

Specific implementation of making independent and different design according to changes of the vertical-direction channel and of the horizontal-direction channel may include:

a. Determine sub-band division and a sub-band size that correspond to the CQI or the PMI in fed back content. In each feedback mode that supports horizontal and vertical sub-band CQI feedback or horizontal and vertical sub-band PMI feedback, sub-band division and a sub-band size that correspond to a CQI or a PMI of a vertical-direction sub-band are different from sub-band division and a sub-band size that correspond a CQI or a PMI of a horizontal-direction sub-band, for example, a size of a vertical-direction sub-band may be N (where N is a positive real number greater than or equal to i) times a size of a horizontal-direction sub-band.

In a 3D feedback mode, a specific example of division of sizes of horizontal-direction and vertical-direction sub-bands is shown in Table 1:

TABLE 1

| System Bandwidth NDLRB System bandwidth (quantity of resource parts) | Sub-band Size size of a sub-band (horizontal A, vertical V) (quantity RBS of resource blocks) | Bandwidth Parts Bandwidth parts (horizontal A, vertical V) (J) |
|---|---|---|
| 6-7 | NA | NA |
| 8-10 | (4, 4) | (1, 1) |

TABLE 1-continued

| System Bandwidth NDLRB System bandwidth (quantity of resource parts) | Sub-band Size size of a sub-band (horizontal A, vertical V) (quantity RBS of resource blocks) | Bandwidth Parts Bandwidth parts (horizontal A, vertical V) (J) |
|---|---|---|
| 11-26 | (4, 8) | (2, 1) |
| 27-63 | (6, 9) | (3, 2) |
| 64-110 | (8, 16) | (4, 2) |

In each system bandwidth configuration in Table 1, entire system bandwidth is divided into multiple sub-band groups to be measured, that is, bandwidth parts (Bandwidth Part), where each bandwidth part includes at least one sub-band, and sizes of the horizontal and vertical sub-bands respectively represent frequency domain feedback granularities of the PMI or the CQI of the horizontal-direction and vertical-direction sub-bands.

b. Determine feedback cycle of the CQI or PMI in the fed back content. Further, in each PUCCH periodic feedback mode, a feedback cycle of a vertical-direction CQI (a wideband or a sub-band) or a vertical-direction PMI (a wideband or a sub-band) may be different from that of a horizontal-direction CQI or a horizontal-direction PMI, and the feedback cycle of the vertical-direction CQI (a wideband or a sub-band) or the vertical-direction PMI (a wideband or a sub-band) may be M (where M is a positive real number greater than or equal to i) times a feedback cycle of a corresponding horizontal-direction CQI (a wideband or a sub-band) or PMI (a wideband or a sub-band).

c. Determine frequency domain or time domain difference of the CQI in fed back content. CQI quantized values of a frequency domain and a time domain difference of the vertical-direction CQI are different from those of the horizontal-direction CQI, for example, because a vertical-direction channel changes relatively slowly, the CQI quantized value of the frequency domain or the time domain difference of the vertical-direction CQI is different from the CQI quantized value of the frequency domain or the time domain difference of the horizontal-direction CQI. For example, a quantity of bits that is needed by the CQI quantized value of the frequency domain or the time domain difference of the vertical-direction CQI is less than a quantity of bits that is needed by the CQI quantized value of the frequency domain or the time domain difference of the horizontal-direction CQI; or a value range of a CQI quantized value of the frequency domain or a space domain difference of the vertical-direction CQI is less than a value range of a CQI quantized value of the frequency domain or a space domain difference of the horizontal-direction CQI.

d. Determine design of a precoding matrix type indicator (PTI) field in fed back content. There is a PTI field in the horizontal direction, where this PTI is used to distinguish a different type of reported precoding matrix (a long-term wideband PMI or a short-term sub-band PMI); and in this embodiment of the present application, there is no PTI field in the vertical direction, because there may be only one type of precoding matrix: the long-term wideband vertical-direction PMI.

Any one of the foregoing implementation manners a, b, c, and d can achieve a beneficial effect of reducing overheads and reducing bandwidth.

Each new 3D feedback mode is a combination of horizontal-direction and vertical-direction channel state information, and each new 3D feedback mode is defined as a combination of a horizontal-direction PMI feedback type and a vertical-direction PMI feedback type of a corresponding specific PUSCH CQI feedback type.

Both of the horizontal-direction PMI feedback type and the vertical-direction PMI feedback type include the following three frequency domain feedback granularity types: a non-precoding matrix indicator No PMI, a single precoding matrix indicator Single PMI, and multiple precoding matrix indicators Multiple PMI.

The PUSCH CQI feedback type includes the following three frequency domain feedback granularity types: a wideband CQI, a user selected sub-band CQI, and a higher layer-configured sub-band CQI.

The feeding back channel state information includes: feeding back the channel state information according to a PUSCH CQI feedback type, a horizontal-direction PMI feedback type, and a vertical-direction PMI feedback type that correspond to each new 3D feedback mode.

In this embodiment, for ease of description of the new 3D feedback mode, combination manners of frequency domain feedback granularities of the CQI, a vertical-direction PMI, and a horizontal-direction PMI may be expressed in the form of a table. Specifically, in this embodiment, the combination manners of the frequency domain feedback granularities of the CQI, the vertical-direction PMI, and the horizontal-direction PMI may be the cases shown in Table 2:

TABLE 2

| | | PUSCH CQI feedback type | | |
|---|---|---|---|---|
| | | Wideband (wideband CQI) | UE Selected (sub-band CQI) | Higher Layer-configured (sub-band CQI) |
| PMI feedback type (horizontal, vertical) (the first PMI feedback type is the horizontal-direction PMI feedback type, the second PMI feedback type is the vertical-direction PMI feedback type) | (NP, NP) | Mode1-0-0 | Mode2-0-0 | Mode3-0-0 |
| | (NP, SP) | Mode1-0-1 | Mode2-0-1 | Mode3-0-1 |
| | (NP, MP) | Mode1-0-2 | Mode2-0-2 | Mode3-0-2 |
| | (SP, NP) | Mode1-1-0 | Mode2-1-0 | Mode3-1-0 |
| | (SP, SP) | Mode1-1-1 | Mode2-1-1 | Mode3-1-1 |
| | (SP, MP) | Mode1-1-2 | Mode2-1-2 | Mode3-1-2 |
| | (MP, NP) | Mode1-2-0 | Mode2-2-0 | Mode3-2-0 |
| | (MP, SP) | Mode1-2-1 | Mode2-2-1 | Mode3-2-1 |
| | (MP, MP) | Mode1-2-2 | Mode2-2-2 | Mode3-2-2 |

In Table 2, NP represents a No PMI, that is, a non-precoding matrix indicator; SP represents a Single PMI, that is, a single precoding matrix indicator; and MP represents Multiple PMI, that is, multiple precoding matrix indicators. Each new 3D PUSCH feedback mode may be represented as Mode x-y-z, where x represents the PUSCH CQI feedback type (which corresponds to a specific frequency domain feedback granularity level), y represents a PUSCH horizontal-direction PMI feedback type (which corresponds to a specific frequency domain feedback granularity level), and z represents a PUSCH vertical-direction PMI feedback type (which corresponds to a specific frequency domain feedback granularity level). For example, Mode 1-1-0 represents a wideband CQI report mode based on that there is the single precoding matrix indicator SP in the horizontal direction (which may be also referred to as a wideband PMI), and no PMI in the vertical direction.

When a user detects that a CSI request field value in uplink control information or random access response permission corresponds to one aperiodic CSI report, the aperiodic CSI report of the user for a serving cell is triggered. A specific report mode (which may be any option in Table 2) is semi-statically configured and notified by higher layer signaling.

For example, a CQI and a PMI that are in a mode 1-2-2 (which represents a report mode of a wideband CQI-based on a horizontal-direction MP: multiple precoding matrix indicators PMI, and a vertical-direction MP: multiple precoding matrix indicators PMI) based on Table 2 are obtained in the following manner:

Assuming that data is transmitted on at least one sub-band, one corresponding optimal PMI is separately selected for each sub-band in the horizontal direction and the vertical direction. That is, when the entire bandwidth is divided into S (S>1) sub-bands, one optimal PMI is separately selected for each sub-band in the horizontal direction and the vertical direction. For example, assuming that the entire bandwidth has three sub-bands in total, there are 3*2=6 PMIs (where each sub-band corresponds to one vertical-direction PMI and one horizontal-direction PMI).

The user reports a wideband CQI value of each code word, and this CQI value is calculated based on a value of the horizontal-direction PMI and a value of the vertical-direction PMI of each sub-band of the S sub-bands.

In addition to a transmission mode 9 configured for CSI-RSs of eight ports, the user reports a horizontal-direction PMI indicator and a vertical-direction PMI indicator of each sub-band. In the transmission mode 9 configured for CSI-RSs of eight ports, horizontal-direction and vertical-direction first precoding matrix indicators $i_1$ of the S sub-bands are reported, and horizontal-direction and vertical-direction second precoding matrix indicators $i_2$ of each sub-band are reported.

In transmission modes 4, 8, and 9, the horizontal-direction PMI, the vertical-direction PMI, and the CQI are calculated based on a reported horizontal-direction RI and a reported vertical-direction RI. In another mode, values of the reported horizontal-direction PMI, the reported vertical-direction PMI, and the CQI are based on the rank 1.

Description of the new 3D feedback mode Mode x-y-z (y>z) or Mode x-y-z (z>y) in Table 2 is based on extension of a feedback mode Mode x-y (y>z) or Mode x-z (z>y) in 3GPP Rel-10 of a Long Term Evolution LTE system, that is, selection and reporting of the vertical-direction PMI of a PMI frequency domain granularity type that corresponds to z are added to a place, related to the selection and reporting of the PMI, in the Mode x-y. Moreover, the CQI in the Mode x-y-z is calculated based on the foregoing extended horizontal-direction PMI and vertical-direction PMI. In the Mode x-y-z mode, when y>z, a vertical-direction PMI frequency domain granularity is greater than a horizontal-direction PMI frequency domain granularity, which is equivalent to that the vertical direction uses a same vertical-direction precoding matrix on multiple horizontal-direction frequency domain granularities; and when y<z, the horizontal-direction PMI frequency domain granularity may be greater than the vertical-direction PMI frequency domain granularity, which is equivalent to that horizontal direction uses a same horizontal-direction precoding matrix on multiple vertical-direction frequency domain granularities.

For example, a CQI and a PMI that are in a mode 1-2-1 (which represents a report mode of a wideband CQI-based on a horizontal-direction MP: multiple precoding matrix indicators PMI, and a vertical-direction SP: a single precoding matrix indicator PMI) based on Table 2 are obtained in the following manner.

Assuming that data is transmitted on at least one sub-band, one optimal horizontal-direction PMI is selected for each sub-band, and one optimal vertical-direction wideband PMI based on the S sub-bands is selected (that is, corresponding to one vertical-direction wideband PMI on the S sub-bands).

The user reports a wideband CQI value of each code word, and this CQI value is calculated based on a value of the horizontal-direction PMI and a value of the vertical-direction wideband PMI of each sub-band of the S sub-bands used for data transmission. In addition to a transmission mode 9 configured for CSI-RSs of eight ports, the user reports a horizontal-direction PMI indicator of each sub-band and vertical-direction PMI indicators of the S sub-bands. In the transmission mode 9 configured for CSI-RSs of eight ports, horizontal-direction and vertical-direction first precoding matrix indicators $i_1$ of the S sub-bands are reported, and horizontal-direction and vertical-direction second precoding matrix indicators $i_2$ of each sub-band are reported.

In transmission modes 4, 8, and 9, the horizontal-direction PMI and the vertical-direction PMI, and the CQI are calculated based on a reported horizontal-direction RI and a reported vertical-direction RI. In another mode, values of the reported horizontal-direction PMI, the reported vertical-direction PMI, and the CQI are based on the rank 1.

Embodiment 2

The channel state information is fed back by using the PUSCH. Considering that a horizontal-direction channel change feature of a channel is different from a vertical-direction channel change feature, vertical-direction angel extension is less than horizontal-direction angel extension, and a vertical-direction PMI time domain change of a user is less than a horizontal-direction PMI time domain change, so that a vertical-direction PMI frequency domain correlation of the user is greater than horizontal-direction PMI frequency domain correlation of the user. The foregoing feature of a horizontal direction and a vertical direction is considered in this embodiment, and when the channel state information is fed back, a frequency domain feedback granularity of the first precoding matrix indicator information PMI is less than or equal to a frequency domain feedback granularity of the second precoding matrix indicator information PMI. Similarly, the first precoding matrix indicator information corresponds to horizontal-direction PMI indicator information, and the second precoding matrix indicator information corresponds to vertical-direction PMI indicator information.

In this embodiment, the combination manners of the frequency domain feedback granularities of the CQI, the vertical-direction PMI and the horizontal-direction PMI may be the cases shown in Table 3:

TABLE 3

| | | PUSCH CQI feedback type | | |
|---|---|---|---|---|
| | | Wideband (wideband CQI) | UE Selected (sub-band CQI) | Higher Layer-configured (sub-band CQI) |
| PMI feedback type (horizontal, | NP NP | Mode1-0-0 | Mode2-0-0 | Mode3-0-0 |
| | SP NP | Mode1-1-0 | Mode2-1-0 | Mode3-1-0 |

TABLE 3-continued

| | | PUSCH CQI feedback type | | |
|---|---|---|---|---|
| | | Wideband (wideband CQI) | UE Selected (sub-band CQI) | Higher Layer-configured (sub-band CQI) |
| vertical) (the first PMI feedback type is the horizontal-direction PMI feedback type, the second PMI feedback type is the vertical-direction PMI feedback type) | SP SP MP NP MP SP MP MP | Mode1-1-1 Mode1-2-0 Mode1-2-1 Mode1-2-2 | Mode2-1-1 Mode2-2-0 Mode2-2-1 Mode2-2-2 | Mode3-1-1 Mode3-2-0 Mode3-2-1 Mode3-2-2 |

In Table 3, NP represents a No PMI, that is, a non-precoding matrix indicator; SP represents a Single PMI, that is, a single precoding matrix indicator; and MP represents multiple precoding matrix indicators, that is, Multiple PMI.

In new 3D feedback modes listed in Table 3, a vertical-direction feedback granularity and a horizontal-direction feedback granularity are not completely the same. Considering a characteristic that a vertical-direction channel changes relatively slowly, a preferred combination manner among the cases described in Table 3 may be the following combinations in which the vertical-direction feedback granularity is greater than or equal to the horizontal-direction feedback granularity: a Mode 1-1-0/2-1-0/3-1-0 (a horizontal-direction Single PMI and a vertical-direction No PMI), a Mode 1-2-0/2-2-0/3-2-0 (a horizontal-direction Multiple PMI and the vertical-direction No PMI), a Mode 1-2-1/2-2-1/3-2-1 (the horizontal-direction Multiple PMI and a vertical-direction Single PMI), and a Mode 1-2-2/2-2-2/3-2-2 (the horizontal-direction Multiple PMI and a vertical-direction Multiple PMI). The vertical-direction PMI in the mode Mode 1-1-0/2-1-0/3-1-0 (the horizontal-direction Single PMI and the vertical-direction No PMI) and the Mode 1-2-0/2-2-0/3-2-0 (the horizontal-direction Multiple PMI and the vertical-direction No PMI) may be predefined.

A specific implementation of each new feedback mode in Table 3 is the same as an implementation manner provided in Embodiment 1. Optionally, in each feedback mode that supports a sub-band CQI or a sub-band PMI, sub-band division and a sub-band size that are in the vertical direction are different from those in the horizontal-direction, and a size of a vertical-direction sub-band is N (where N is a positive real number greater than or equal to 1) times a size of a horizontal-direction sub-band. Further, in each PUCCH periodic feedback mode, a feedback cycle of a vertical-direction CQI or a vertical-direction PMI may be different from that of a horizontal-direction, and the feedback cycle of the vertical-direction CQI (a wideband or a sub-band) or the vertical-direction PMI (a wideband or a sub-band) may be M (where M is a positive real number greater than or equal to 1) times a feedback cycle of a corresponding horizontal-direction CQI (a wideband or a sub-band) or PMI (a wideband or a sub-band). Even, CQI quantized values of a frequency domain and a space domain difference of the vertical-direction CQI are different from those of the horizontal-direction CQI, for example, because a vertical-direction channel changes relatively slowly, the CQI quantized value of the frequency domain or the space domain difference of the vertical-direction CQI is different from the CQI quantized value of the frequency domain or the time domain difference of the horizontal-direction CQI; and there is no PTI (precoding type indicator) field in the vertical direction, so that a beneficial effect of reducing overheads and reducing bandwidth is achieved.

In the embodiment, vertical-direction angel extension is less than horizontal-direction angel extension, and a vertical-direction PMI time domain change of a user is less than a horizontal-direction PMI time domain change, so that vertical-direction PMI frequency domain correlation of the user is greater than horizontal-direction PMI frequency domain correlation of the user. With respect to this characteristic, a frequency domain feedback granularity of vertical-direction precoding matrix indicator information PMI is designed to be greater than or equal to a frequency domain feedback granularity of horizontal-direction precoding matrix indicator information PMI, thereby achieving a beneficial effect of reducing design complexity of a feedback mode and reducing feedback signaling overheads.

Embodiment 3

The channel state information is fed back by using the PUCCH. When the channel state information is fed back by using the PUCCH, not only vertical-direction and horizontal-direction frequency domain feedback granularities need to be considered, but also timing design of feedback quantities needs to be considered. Design and description of a specific new PUCCH 3D feedback mode are provided in the following table:

In this embodiment, combination manners of frequency domain feedback granularities of the CQI, the vertical-direction PMI and the horizontal-direction PMI may be the cases shown in Table 4.

In Table 4, NP represents a No PMI, that is, a non-precoding matrix indicator; SP represents a Single PMI, that is, a single precoding matrix indicator; and MP represents Multiple PMI, that is, multiple precoding matrix indicators.

In the cases provided in Table 4, a vertical-direction feedback granularity and a horizontal-direction feedback granularity are not completely the same. Considering a characteristic that a vertical-direction channel changes relatively slowly, the following combinations in which the vertical-direction feedback granularity is greater than the horizontal-direction feedback granularity are preferred: a Mode 1-1-0/2-1-0 (a horizontal-direction Single PMI and a vertical-direction No PMI), a Mode 1-2-0/2-2-0 (a horizontal-direction Multiple PMI and the vertical-direction No PMI), and a Mode 1-2-1/2-2-1 (the horizontal-direction Multiple PMI and a vertical-direction Single PMI). The vertical-direction No PMI in the foregoing table means that no PMI is fed back in the vertical-direction, and only a horizontal-direction precoding matrix indicator PMI is fed back.

TABLE 4

| | | PUCCH CQI feedback type | |
|---|---|---|---|
| | | Wideband (wideband CQI) | UE Selected (sub-band CQI) |
| PMI feedback type (horizontal, vertical) | NP NP | Mode1-0-0 | Mode2-0-0 |

TABLE 4-continued

| | | PUCCH CQI feedback type | |
|---|---|---|---|
| | | Wideband (wideband CQI) | UE Selected (sub-band CQI) |
| (the first PMI feedback type is the horizontal-direction PMI feedback type, the second PMI feedback type is the vertical-direction PMI feedback type) | SP NP | Mode1-1-0 | Mode2-1-0 |
| | SP SP | Mode1-1-1 | Mode2-1-1 |
| | MP NP | Mode1-2-0 | Mode2-2-0 |
| | MP SP | Mode1-2-1 | Mode2-2-1 |
| | MP MP | Mode1-2-2 | Mode2-2-2 |

By using that a vertical-direction PMI frequency domain granularity is greater than a horizontal-direction PMI frequency domain granularity as an example, considering that there is only one precoding matrix indicator in the vertical-direction, specifically, for example, one wideband PMI, according to the foregoing case in which vertical-direction channel state information corresponds to the second channel state information, in this example, specifically, the second precoding matrix indicator information may include only the third type of precoding matrix indicator PMI3. Specific timing design in the new feedback modes includes the following multiple manners.

Timing design 1: In a sub-mode 1 of a PUCCH 1-1, when the channel state information is fed back by using the physical uplink control channel (PUCCH), the channel state information is fed back according to a channel state information CSI feedback cycle and feedback timing of 3GPP Rel-10 of a Long Term Evolution LTE system, which includes: feeding back the channel state information in one CSI feedback cycle of the sub-mode 1 of the physical uplink control channel PUCCH 1-1, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the RI1, the RI2, and the PMI1 are fed back in a first feedback timeslot; the PMI2, the PMI3, and the CQI are fed back in a second feedback timeslot; and the PMI2, the PMI3, and the CQI are fed back in a third feedback timeslot; or the RI1, the RI2, the PMI1, and the PMI3 are fed back in a first feedback timeslot; the PMI2, the PMI4, and the CQI are fed back in a second feedback timeslot; and the PMI2, the PMI4, and the CQI are fed back in a third feedback timeslot.

Feedback content of each of the foregoing three feedback timeslots is a newly introduced PUCCH report type (PUCCH new report type).

A piece of new 3D feedback timing design of the sub-mode 1 of the PUCCH 1-1 is described in detail below. A connection sign "+" may be used to represent that multiple parameters are fed back in one feedback timeslot, for example: the RI1 and the RI2 are fed back in the first feedback timeslot, which may be represented as RI1+RI2. Comparison between new 3D feedback timing (corresponding to a row Rel-12 of the table) and Rel-8 as well as Rel-10 is shown in Table 5:

TABLE 5

| | First feedback timeslot | Second feedback timeslot | Third feedback timeslot | Fourth feedback timeslot |
|---|---|---|---|---|
| Rel-8 | RI | CQI + PMI | CQI + PMI | RI |
| Rel-10 | RI + PMI1 | CQI + PMI2 | CQI + PMI2 | RI + PMI1 |
| Rel-12 Option 1 | RI1 + RI2 | CQI + PMI1 + PMI3 | CQI + PMI2 | RI1 + RI2 |
| Rel-12 Option 2 | RI1 + RI2 + PMI1 | CQI + PMI2 + PMI3 | CQI + PMI2 + PMI3 | RI1 + RI2 + PMI1 |
| Rel-12 Option 3 | RI1 + RI2 + PMI1 + PMI3 | CQI + PMI2 + PMI4 | CQI + PMI2 + PMI4 | RI1 + RI2 + PMI1 + PMI3 |

Table 5 is a piece of CSI feedback design of the sub-mode 1 of the physical uplink control channel PUCCH 1-1. Rel-12 Option 1 is a possible implementation manner of the 3D feedback timing of the sub-mode 1 of the PUCCH 1-1 provided in the present application: the CSI feedback cycle includes three feedback timeslots, where: the RI1 and the RI2 are fed back in the first feedback timeslot; the PMI1, the PMI3, and the CQI are fed back in the second feedback timeslot; and the CQI and the PMI2 are fed back in the third feedback timeslot. Because feedback of the channel state information is periodic, feedback of the fourth feedback timeslot is the same as that of the first feedback timeslot.

The new 3D feedback timing design of the sub-mode 1 of the PUCCH 1-1 of Table 5 maintains feedback moments of Rel-8 and Rel-10, but changes content fed back at each feedback moment. In the embodiment, the first precoding matrix indicator information (corresponding to the horizontal direction) further includes a first type of precoding matrix indicator PMI1 (or referred to as a long-term PMI) and a second type of precoding matrix indicator PMI2 (or referred to as a short-term PMI), and the second precoding matrix indicator information (corresponding to the vertical direction) further includes a first type of precoding matrix indicator PMI3 and a second type of precoding matrix indicator PMI4. Specifically, at a feedback moment at which the RI and the wideband PMI1 are fed back in 3GPP Rel-10, a horizontal-direction Rank (that is, the RI1) and a vertical-direction Rank (that is, the RI2) that are obtained after joint coding are reported; at a moment at which the CQI and the PMI2 are reported in 3GPP Rel-10, the CQI, and the first type of horizontal-direction precoding matrix indicator PMI1 and the first type of vertical-direction precoding matrix indicator PMI3 on which the CQI are based are reported; and at a feedback moment at which the CQI and the PMI2 are reported in Rel-10, the CQI and the second type of horizontal-direction precoding matrix indicator PMI2 are reported. The foregoing new feedback mode adopts the feedback timing of a same feedback mode of the 3GPP Re-10, and a report type of CSI content may also adopt a PUCCH report type of 3GPP Rel-8 or Rel-10. For example, the joint coding, reported at the first moment, of the RI1 and the RI2 may adopt a PUCCH report type 3 or 5 of 3GPP Rel-8 and Rel-10, of the Long Term Evolution LTE system, and the CQI, the first type of horizontal precoding matrix indicator, and the first type of vertical precoding matrix indicator that are reported at the second moment may adopt a PUCCH report type 2c of 3GPP Rel-8 and Rel-10 of the Long Term Evolution LTE system; and the CQI and the second type of horizontal-direction precoding matrix indicator PMI that are reported at the third moment may adopt a PUCCH report type 2b of 3GPP Rel-8 and Rel-10 of the Long Term Evolution LTE system.

The new 3D feedback timing design of the sub-mode 1 of the PUCCH 1-1 maintains the feedback moments of 3GPP Rel-8 and Rel-10, but changes the content fed back at each feedback moment. As shown in Table 6, a new feedback moment (a feedback moment 2 in Table 6) is introduced, based on a timing relationship of a same feedback mode of 3GPP Rel-10, into Rel-12 Option 1 and Rel-12 Option 2 of new 3D feedback timing design shown in Table 6.

TABLE 6

|  | 1 | 2 | 3 | 4-7 | 8 | 9-10 | 11 |
|---|---|---|---|---|---|---|---|
| Rel-8 | RI |  | CQI + PMI |  | CQI + PMI |  | RI |
| Rel-10 | RI + PMI1 |  | CQI + PMI2 |  | CQI + PMI2 |  | RI + PMI1 |
| Rel-12 Option 1 | RI1 + PMI1 | RI2 + PMI3 | CQI + PMI2 |  | CQI + PMI2 |  | RI1 + PMI1 |
| Rel-12 Option 2 | RI1 | RI2 | CQI + PMI1 + PMI3 |  | CQI + PMI1 + PMI3 |  | RI1 |

Timing design 2: In a sub-mode 2 of a PUCCH 1-1, when the channel state information is fed back by using the physical uplink control channel, the feeding back, the channel state information according to a channel state information CSI feedback cycle and feedback timing of 3GPP Rel-10 of a Long Term Evolution LTE system includes: feeding back the channel state information in one CSI feedback cycle of the sub-mode 2 of the physical uplink control channel PUCCH 1-1, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the CSI feedback cycle including three feedback timeslots, where: the RI1 and the RI2 are fed back in a first feedback timeslot; the PMI1, the PMI2, the PMI3, and the CQI are fed back in a second feedback timeslot; and the PMI1, the PMI2, the PMI3, and the CQI are fed back in a third feedback timeslot.

A piece of new 3D feedback timing design of the sub-mode 2 of the PUCCH 1-1 is described in detail below. Comparison between new 3D feedback timing (corresponding to a row Rel-12 of the table) and Rel-8 as well as Rel-10 is shown in Table 7:

TABLE 7

|  | First feedback timeslot | Second feedback time slot | Third feedback time slot | Fourth feedback timeslot |
|---|---|---|---|---|
| Rel-8 | RI | CQI + PMI | CQI + PMI | RI |
| Rel-10 | RI | CQI + PMI 1 + PMI2 | CQI + PMI1 + PMI2 | PMI1 |
| Rel-12 Option 1 | RI1 + RI2 | CQI + PMI1 + PMI3 | CQI + PMI2 | RI1 + RI2 |
| Rel-12 Option 2 | RI1 + RI2 | PMI1 + PMI2 + PMI3 + CQI | PMI1 + PMI2 + PMI3 + CQI | RI1 + RI2 |

The new 3D feedback timing design, shown in Table 7, of the sub-mode 2 of the PUCCH 1-1 maintains feedback moments of Rel-8 and Rel-10, but changes content fed back at each feedback moment. In the embodiment, the first precoding matrix indicator information (corresponding to the horizontal direction) further includes a first type of precoding matrix indicator PMI1 and a second type of precoding matrix indicator PMI2, and the second precoding matrix indicator information (corresponding to the vertical direction) further includes a first type of precoding matrix indicator PMI3 and a second type of precoding matrix indicator PMI4. Specifically, at a feedback moment at which the RI is fed back in 3GPP Rel-10, a horizontal-direction Rank (that is, the RI1) and a vertical-direction Rank (that is, the RI2) that are obtained after joint coding are reported; at a moment at which the CQI, the PMI1, and the PMI2 are reported in 3GPP Rel-10, the CQI, and the first type of horizontal-direction precoding matrix indicator PMI1 and the first type of vertical-direction precoding matrix indicator PMI3 on which the CQI are based are reported; and at a next feedback moment at which the CQI, the PMI1, and the PMI2 are reported in Rel-10, the CQI and the second type of horizontal-direction precoding matrix indicator PMI2 are reported. The foregoing new 3D feedback timing design adopts feedback timing design of previous 3GPP Re-10, and a report type of CSI content may also adopt a PUCCH report type of 3GPP Rel-8 or Rel-10. For example, the joint coding, reported at the first moment, of the RI1 and the RI2 may adopt a PUCCH report type 3 or 5 of 3GPP Rel-8 and Rel-10 of the Long Term Evolution LTE system, and the CQI, the first type of horizontal precoding matrix indicators PMI, and the first type of vertical precoding matrix indicator that are reported at the second moment may adopt a PUCCH report type 2c of 3GPP Rel-8 and Rel-10, of the Long Term Evolution LTE system; and the CQI and the second type of horizontal-direction precoding matrix indicator PMI that are reported at the third moment may adopt a PUCCH report type 2b of 3GPP Rel-8 and Rel-10 of the Long Term Evolution LTE system.

The new 3D feedback timing design of the sub-mode 2 of the PUCCH 1-1 maintains the feedback moments of Rel-8 and Rel-10, but changes the content fed back at each feedback moment, which are specifically shown in Table 8:

TABLE 8

| Subframe | 1 | 2 | 3 | 4-7 | 8 | 9-10 | 11 |
|---|---|---|---|---|---|---|---|
| Rel-8 | RI |  | CQI + PMI |  | CQI + PMI |  | RI |
| Rel-10 | RI |  | CQI + PMI1 + PMI2 |  | CQI + PMI1 + PMI2 |  | RI |
| Rel-12 Option 1 | RI1 | RI2 | CQI + PMI1 + PMI3 |  | CQI + PMI1 + PMI3 |  | RI1 |
| Rel-12 Option 2 | RI1 | RI2 | CQI + PMI1 + PMI2 + PMI3 |  | CQI + PMI1 + PMI2 + PMI3 |  | RI1 |
| Rel-12 Option 3 | RI1 + RI2 | PMI3 | CQI + PMI1 + PMI2 |  | CQI + PMI1 + PMI2 |  | RI1 |

A new feedback moment (a feedback moment 2 shown in Table 8) is introduced, based on a timing relationship of 3GPP Rel-10, into Option 1, Option 2, and Option 3 of feedback timing design shown in Table 8.

Timing design 3: In new feedback timing design of a mode of a PUCCH 2-1, the channel state information further includes a precoding matrix type indicator PTI indicating a type of a precoding matrix, and according to different precoding matrix type indicators PTI, this embodiment provides multiple types of feedback timing for the channel state information, which are specifically:

A: When the precoding matrix is of a first type, and the channel state information is fed back by using the physical uplink control channel PUCCH, the feeding back, the channel state information according to a channel state information CSI feedback cycle and feedback timing of 3GPP Rel-10 of a Long Term Evolution LTE system includes: feeding back the channel state information in one CSI feedback cycle of the mode of the physical uplink control channel PUCCH 2-1, where the CSI feedback cycle includes five feedback timeslots, and content fed back in the timeslots is shown as options in Table 9:

TABLE 9

|  | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 0 | PMI1 + PMI2 | PMI3wb + CQIwb | PMI3wb + CQIwb | PMI3wb + CQIwb | RI1 + RI2 PTI = 0 |
| Option 2 | RI1 + RI2 PTI = 0 | PMI1 | PMI2 + PMI3wb + CQIwb | PMI2 + PMI3wb + CQIwb | PMI2 + PMI3wb + CQIwb | RI1 + RI2 PTI = 0 |
| Option 3 | RI1 PTI = 0 | PMI1 + RI2 | PMI2 + PMI3wb + CQIwb | PMI2 + PMI3wb + CQIwb | PMI2 + PMI3wb + CQIwb | RI1 PTI = 0 |
| Option 4 | RI2 PTI = 0 | PMI1 + RI1 | PMI2 + PMI3wb + CQIwb | PMI2 + PMI3wb + CQIwb | PMI2 + PMI3wb + CQIwb | RI2 PTI = 0 | where wb and sb that are appended to parameters PMI and CQI in Table 9 represent that the fed back channel state information of the corresponding PMI and CQI is a wideband and a sub-band respectively, where wb corresponds to the wideband, and sb corresponds to the sub-band, and the foregoing parameter that is not marked with wb and sb is considered as wb by default. PTI=0 represents that the type of the precoding matrix is the first type, and the feedback timeslots respectively represent multiple feedback moments within one feedback cycle of the mode of the PUCCH 2-1 of 3GPP Rel-10 of the Long Term Evolution LTE system.

B: When the precoding matrix is of a second type, and the channel state information is fed back by using the physical uplink control channel PUCCH, the channel state information CSI feedback cycle includes five feedback timeslots, and content fed back in the timeslots is shown as options in Table 10:

TABLE 10

|  | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 1 | PMI1 + PMI2 + CQIwb | PMI3sb + CQIsb | PMI3sb + CQIsb | PMI3sb + CQIsb | RI1 + RI2 PTI = 1 |
| Option 2 | RI2 + PMI2 PTI = 1 | PMI1 + RI1 CQIwb | PMI3sb + CQIsb | PMI3sb + CQIsb | PMI3sb + CQIsb | RI2 + PMI2 PTI = 1 |
| Option 3 | RI2 + PMI2 PTI = 1 | PMI1 + RI1 CQIwb | PMI3sb + PMI4sb + CQIsb | PMI3sb + PMI4sb + CQIsb | PMI3sb + PMI4sb + CQIsb | RI2 + PMI2 PTI = 1 |
| Option 4 | RI2 PTI = 1 | PMI1 + RI1 CQIwb | PMI3sb + PMI2 + CQIsb | PMI3sb + PMI2 + CQIsb | PMI3sb + PMI2 + CQIsb | RI2 PTI = 1 |
| Option 5 | RI2 + RI1 PTI = 1 | PMI1 CQIwb | PMI3sb + PMI2 + CQIsb | PMI3sb + PMI2 + CQIsb | PMI3sb + PMI2 + CQIsb | RI2 + RI1 PTI = 1 | where wb and sb represent that the fed back channel state information of the corresponding PMI and CQI corresponds to a wideband and a sub-band respectively, where wb corresponds to the wideband, and sb corresponds to the sub-band; the foregoing parameter that is not marked with wb and sb is considered as wb by default; PTI=1 represents that the type of the precoding matrix is the second type; and the feedback timeslots respectively represent multiple feedback moments within one feedback cycle of the mode of the PUCCH 2-1 of 3GPP Rel-10 of the Long Term Evolution LTE system.

New feedback timing design of the mode of the PUCCH 2-1 is shown in Table 11:

TABLE 11

| First feedback timeslot | Second feedback timeslot | Third feedback timeslot | Fourth feedback timeslot | Fifth feedback timeslot | Sixth feedback timeslot |
|---|---|---|---|---|---|
| Sequence 0 | | | | | |
| RI PTI = 0 | PMI1 | PMI2wb + CQIwb | PMI 2wb + CQIwb | PMI2wb + CQIwb | RI PTI = 0 |
| Sequence 1 | | | | | |
| RI PTI = 1 | PMI2wb + CQIwb | PMI2sb1 + CQIsb1 | PMI2sb2 + CQIsb2 | PMI2sb3 + CQIsb3 | RI1 PTI = 1 |
| Rel-12 Sequence 0 | | | | | |
| RI1 + RI2 PTI = 0 | PMI1 + PMI3 | PMI2wb + CQIwb | PMI2wb + CQIwb | PMI2wb + CQIwb | RI1 + RI2 PTI = 0 |
| Rel-12 Sequence 1 | | | | | |
| RI1 + RI2 PTI = 1 | PMI1 + PMI3 + CQIwb | PMI2sb + CQIsb | PMI2sb + CQIsb | PMI2sb + CQIsb | RI1 + RI2 PTI = 1 | tion is fed back according to a higher layer-configured feedback mode, which includes: feeding back the channel state information in one CSI feedback cycle of the mode of the physical uplink control channel PUCCH 2-1, where the In feedback timing shown in Table 12, the new 3D feedback timing design, shown in Table 12, of the PUCCH 2-1 maintains feedback moments of Rel-10, but changes content fed back at each feedback moment. Specifically, at a feedback moment at which the RI and the PTI are fed back in 3GPP Rel-10, a horizontal-direction RI, and a vertical-direction R1 and PTI that are obtained after joint coding are reported; in 3GPP Rel-10 and when PTI=0, at a moment at which the PMI1 is reported, the first type of horizontal and vertical precoding matrix indicators PMI1+PMI2 are reported; at a moment at which the wideband PMI2 and the wideband CQI are reported, the second type of horizontal-direction precoding matrix indicator PMI3 and the wideband CQI are reported; in 3GPP Rel-10, and when PTI=1, at a moment at which the RI and the PTI are reported, the horizontal-direction RI, the vertical-direction RI and the PTI that are obtained after joint coding are reported; at a moment at which the wideband short-term PMI2 and the wideband CQI are reported, the first type of horizontal and vertical precoding matrix indicators PMI1 and PMI3 and the wideband CQI are reported; and at a moment at which a report short-term sub-band PMI and a sub-band CQI are reported, the second type of horizontal-direction precoding matrix indicator PMI2 and the sub-band CQI are reported.

The new feedback mode shown in Table 11 adopts feedback timing design of previous Rel-10, and a report type of CSI content may also adopt a PUCCH report type of 3GPP Rel-8 or Rel-10. For example, as the foregoing example, when PTI=0, the join coding, reported at the first moment, of the RI1, the RI2, and the PTI may adopt a PUCCH report type 5 or 6 of 3GPP Rel-8 or Rel-10 of the Long Term Evolution LTE system; horizontal and vertical widebands and the long-term PMI that are reported at the second moment may adopt a PUCCH report type 2c of 3GPP Rel-8 or Rel-10 of the Long Term Evolution LTE system; and the wideband CQI and the horizontal-direction short-term/wideband PMI that are reported at the third moment may adopt a PUCCH report type 2b of 3GPP Rel-8 or Rel-10 of the Long Term Evolution LTE system. When PTI=0, the join coding, reported at the first moment, of the RI1, the RI2, and the PTI may adopt a PUCCH report type 5 or 6 of 3GPP Rel-8 or Rel-10 of the Long Term Evolution LTE system; horizontal and vertical widebands, the long-term PMI, and the wideband CQI that are reported at the second moment may adopt a PUCCH report type 2c of 3GPP Rel-8 or Rel-10 of the Long Term Evolution LTE system; and the sub-band CQI and the horizontal-direction short-term/sub-band PMI that are reported at the third moment may adopt a PUCCH report type 2b of 3GPP Rel-8 or Rel-10 of the Long Term Evolution LTE system.

Figure 2:
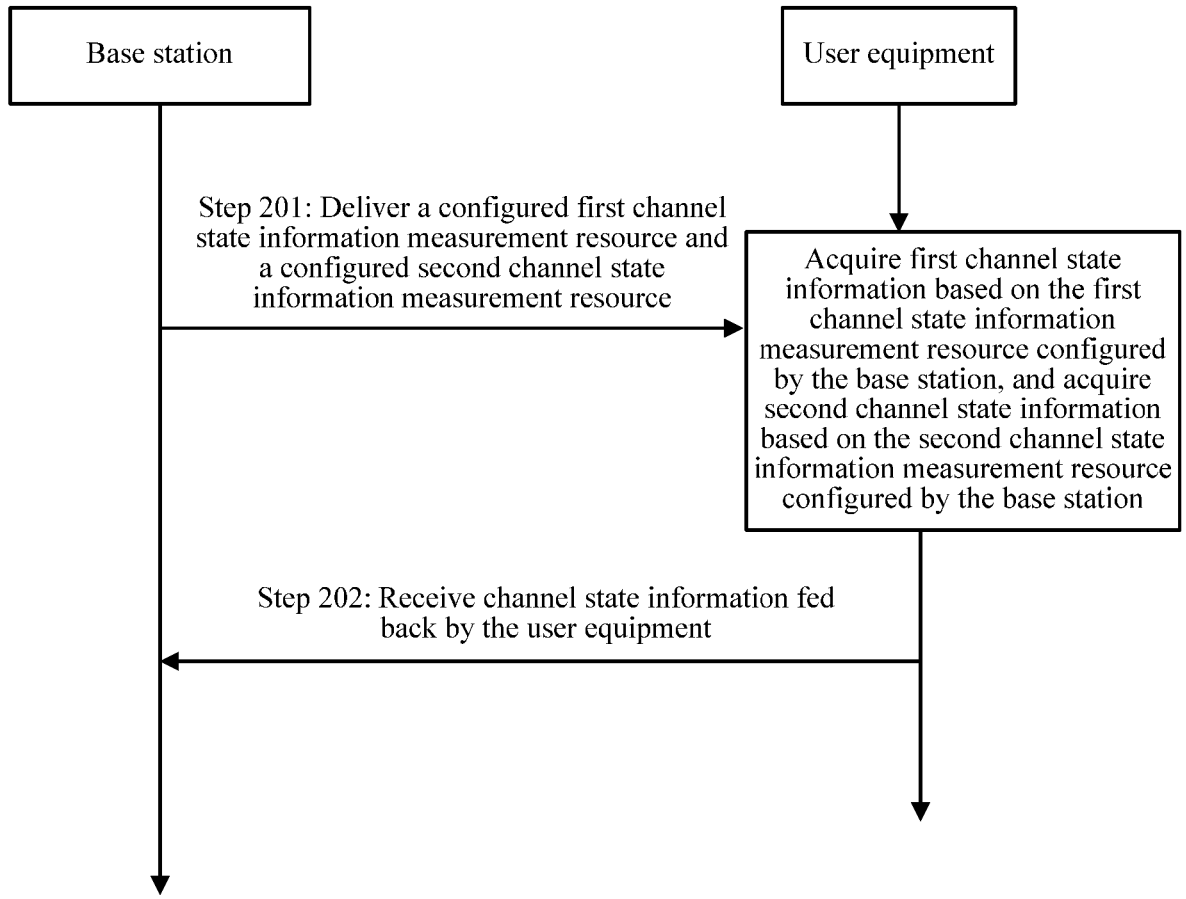
FIG. 2 is a schematic flowchart of a method for measuring channel state information according to an embodiment of the present application.

As shown in FIG. 2, in Embodiment 4, the present application further provides a method for measuring channel state information, where the method includes the following steps.

Step 201: A base station configures a first channel state information measurement resource and a second channel state information measurement resource, and sends the first channel state information measurement resource and the second channel state information measurement resource to user equipment, so that the user equipment acquires first channel state information according to the first channel state information measurement resource, and acquires second channel state information according to the second channel state information measurement resource, where the first channel state information measurement resource and the second channel state information measurement resource respectively correspond to a first antenna port representing a horizontal dimension and a second antenna port representing a vertical dimension.

Step 202: Receive channel state information that is fed back by the user equipment, which includes: receiving the first channel state information that is fed back by the user equipment according to a first feedback mode, and the second channel state information that is fed back by the user equipment according to a second feedback mode, where the second feedback mode is different from the first feedback mode; or receiving third channel state information that is fed back by the user equipment according to a third feedback mode, where the third channel state information is obtained by the user equipment based on the first channel state information and the second channel state information.

To indicate specific measurement information used for measuring the channel state information to a terminal (that is, the user equipment), in this embodiment of the present application, the base station sends a corresponding channel state information measurement resource to the terminal according to a measurement requirement of different dimensions. Therefore, the base station provided in this embodiment of the present application configures and sends the first channel state information measurement resource and the second channel state information measurement resource. For example, the first channel state information measurement resource and the second channel state information measurement resource respectively correspond to the first antenna port representing the horizontal dimension and the second antenna port representing the vertical dimension.

The channel state information is fed back by using a PUSCH. Considering that a horizontal-direction channel change feature of a channel is different from a vertical-direction channel change feature, vertical-direction angel extension is less than horizontal-direction angel extension, and a vertical-direction PMI time domain change of a user is less than a horizontal-direction PMI time domain change, so that a vertical-direction PMI frequency domain correlation of the user is greater than horizontal-direction PMI frequency domain correlation of the user.

The first channel state information includes first precoding matrix indicator information, the second channel state information includes second precoding matrix indicator information, and the second feedback mode being different from the first feedback mode includes: a frequency domain feedback granularity of the first precoding matrix indicator information is less than or equal to a frequency domain feedback granularity of the second precoding matrix indicator information; or a feedback cycle of the first channel state information is less than a feedback cycle of the second channel state information.

For the foregoing feedback method of channel state information, as for the vertical dimension and the horizontal dimension of an antenna, the fed back channel state information in this embodiment of the present application are independent, and compared with fed back channel state information in the prior art, content of the channel state information changes. Therefore, the channel state information in this embodiment of the present application may be: the first channel state information including the first precoding matrix indicator information and first rank indicator information RI1, and the second channel state information including the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4.

For a change of channel information fed back by the user equipment, the received channel state information fed back by the user equipment includes: the first channel state information, the second channel state information, and a channel quality indicator CQI; or third precoding matrix indicator information, third rank indicator information, and a CQI, where: the third precoding matrix indicator information is obtained based on at least three of the PMI1, the PMI2, the PMI3, and the PMI4; the third rank indicator information is obtained based on the RI1 and the RI2; and the channel quality indicator CQI is obtained by the user equipment based on the first channel state information and the second channel state information.

In the foregoing feedback method of channel state information, because when the user equipment feeds back the channel state information, some new 3D feedback modes are provided according to a characteristic of the channel state information, the new 3D feedback mode may be: feeding back, in an existing feedback cycle of the channel state information, different content or setting a new feedback timeslot for feeding back the channel state information. Therefore, a receiver on a base station side correspondingly receives channel state information for these new 3D feedback modes, and a corresponding specific implementation includes:

Manner 1: The user equipment feeds back the channel state information to the base station by using a physical uplink control channel PUCCH, and the received channel state information fed back by the user equipment includes: receiving the channel state information in one channel state information feedback cycle of the physical uplink control channel PUCCH, where the one channel state information feedback cycle includes three feedback timeslots, where: the RI1 and the RI2 are received in a first feedback timeslot; the PMI1, the PMI3, and the CQI are received in a second feedback timeslot; and the CQI and the PMI2 are received in a third feedback timeslot; or the RI1, the RI2, and the PMI1 are received in a first feedback timeslot; the PMI2, the PMI3, and the CQI are received in a second feedback timeslot; and the PMI2, the PMI3, and the CQI are received in a third feedback timeslot; or the RI1, the RI2, the PMI1, and the PMI3 are received in a first feedback timeslot; the PMI2, the PMI4, and the CQI are received in a second feedback timeslot; and the PMI2, the PMI4, and the CQI are received in a third feedback timeslot.

Manner 2: The user equipment feeds back the channel state information to the base station by using a physical uplink control channel PUCCH, and the received channel state information fed back by the user equipment includes: receiving the channel state information in one channel state information CSI feedback cycle of the physical uplink control channel PUCCH, where the CSI feedback cycle includes three feedback timeslots, where: the RI1 and the RI2 are received in a first feedback timeslot; the PMI1, the PMI3, and the CQI are received in a second feedback timeslot; and the CQI and the PMI2 are received in a third feedback timeslot; or the CSI feedback cycle includes three feedback timeslots, where: the RI1 and the RI2 are received in a first feedback timeslot; the PMI1, the PMI2, the PMI3, and the CQI are received in a second feedback timeslot; and the PMI1, the PMI2, the PMI3, and the CQI are received in a third feedback timeslot.

Manner 3: The channel state information further includes a precoding matrix type indicator PTI indicating a type of a precoding matrix, and when the precoding matrix is of a first type, the user equipment feeds back the channel state information to the base station by using a physical uplink control channel PUCCH, and the receiving, by the base station, channel state information that is fed back by the user equipment includes: receiving, by the base station, the channel state information in one channel state information CSI feedback cycle of the physical uplink control channel PUCCH, where the CSI feedback cycle includes five feedback timeslots, and content received in the timeslots is shown as options in the following table:

| | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 0 | PMI1 + PMI2 | PMI3wb + CQIwb | PMI3wb + CQIwb | PMI3wb + CQIwb | RI1 + RI2 PTI = 0 |
| Option 2 | RI1 + RI2 PTI = 0 | PMI1 | PMI2 + PMI3wb + CQIwb | PMI2 + PMI3wb + CQIwb | PMI2 + PMI3wb + CQIwb | RI1 + RI2 PTI = 0 |
| Option 3 | RI1 PTI = 0 | PMI1 + RI2 | PMI2 + PMI3wb + CQIwb | PMI2 + PMI3wb + CQIwb | PMI2 + PMI3wb + CQIwb | RI1 PTI = 0 |
| Option 4 | RI2 PTI = 0 | PMI1 + RI1 | PMI2 + PMI3wb + CQIwb | PMI2 + PMI3wb + CQIwb | PMI2 + PMI3wb + CQIwb | RI2 PTI = 0 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the first type; and the feedback timeslots correspond to feedback moments within one CSI feedback cycle.

Manner 4: The channel state information further includes a precoding matrix type indicator PTI indicating a type of a precoding matrix, and when the precoding matrix is of a second type, the user equipment feeds back the channel state information to the base station by using a physical uplink control channel PUCCH, and the receiving, by the base station, channel state information that is fed back by the user equipment includes: receiving, by the base station, the channel state information in one channel state information CSI feedback cycle of the physical uplink control channel PUCCH, where the CSI feedback cycle includes five feedback timeslots, and content received in the timeslots is shown as options in the following table:

| | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 1 | PMI1 + PMI2 + CQIwb | PMI3sb + CQIsb | PMI3sb + CQIsb | PMI3sb + CQIsb | RI1 + RI2 PTI = 1 |
| Option 2 | RI2 + PMI2 PTI = 1 | PMI1 + RI1 CQIwb | PMI3sb + CQIsb | PMI3sb + CQIsb | PMI3sb + CQIsb | RI2 + PMI2 PTI = 1 |
| Option 3 | RI2 + PMI2 PTI = 1 | PMI1 + RI1 CQIwb | PMI3sb + PMI4sb + CQIsb | PMI3sb + PMI4sb + CQIsb | PMI3sb + PMI4sb + CQIsb | RI2 + PMI2 PTI = 1 |
| Option 4 | RI2 PTI = 1 | PMI1 + RI1 CQIwb | PMI3sb + PMI2 + CQIsb | PMI3sb + PMI2 + CQIsb | PMI3sb + PMI2 + CQIsb | RI2 PTI = 1 |
| Option 5 | RI2 + RI1 PTI = 1 | PMI1 + CQIwb | PMI3sb + PMI2 + CQIsb | PMI3sb + PMI2 + CQIsb | PMI3sb + PMI2 + CQIsb | RI2 + RI1 PTI = 1 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the second type; and the feedback timeslots correspond to feedback moments within one CSI feedback cycle.

Figure 3:
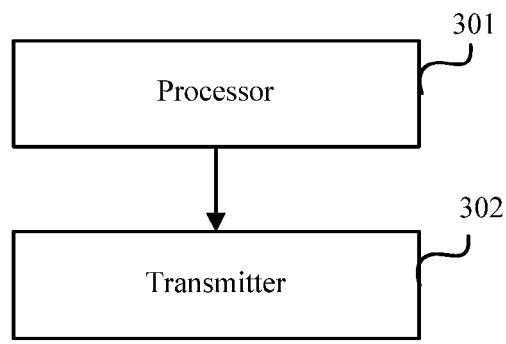
FIG. 3 is a schematic diagram of a structure of user equipment according to an embodiment of the present application.

As shown in FIG. 3, according to the foregoing method, the present application further provides user equipment, where the user equipment includes: a processor 301, configured to acquire first channel state information based on a first channel state information measurement resource configured by a base station, and acquire second channel state information based on a second channel state information measurement resource configured by the base station, where the first channel state information measurement resource and the second channel state information measurement resource respectively correspond to a first antenna port representing a horizontal dimension and a second antenna port representing a vertical dimension; and a sender 302, configured to feed back channel state information to the base station, which includes: feeding back the first channel state information to the base station according to a first feedback mode, and feeding back the second channel state information to the base station according to a second feedback mode, where the second feedback mode is different from the first feedback mode; or feeding back third channel state information according to a third feedback mode, where the third channel state information is obtained by the processor based on the first channel state information and the second channel state information.

In this embodiment of the present application, the first channel state information includes first precoding matrix indicator information, the second channel state information includes second precoding matrix indicator information, and when the sender 302 feeds back the channel state information, a frequency domain feedback granularity of the first precoding matrix indicator information is less than or equal to a frequency domain feedback granularity of the second precoding matrix indicator information.

In addition, to feed back, according to a characteristic that a vertical-direction channel changes slowly, the channel state information in a manner that is different from a manner for feeding back horizontal-direction channel state information, when the sender 302 feeds back the channel state information, a feedback cycle of the first channel state information is less than a feedback cycle of the second channel state information.

Specifically, when the channel state information is fed back, the first channel state information includes the first precoding matrix indicator information and first rank indicator information RI1, and the second channel state information includes the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4; the processor 301 obtains a channel quality indicator CQI based on the first channel state information and the second channel state information; and the channel state information that is fed back by the sender 302 to the base station includes the first channel state information, the second channel state information, and the CQI; or third precoding matrix indicator information, third rank indicator information, and the CQI, where the third precoding matrix indicator information is obtained based on at least three of the PMI1, the PMI2, the PMI3, and the PMI4, and the third rank indicator information is obtained based on the RI1 and the RI2.

In addition, because the physical uplink control channel PUCCH has a limited resource, when the channel state information is fed back by using the physical uplink control channel PUCCH, it needs to consider how to feed back parts of the channel state information, which specifically includes:

Manner 1: The user equipment feeds back the channel state information to the base station by using the physical uplink control channel PUCCH, and the transmitter 302 feeds back the channel state information in one channel state information CSI feedback cycle of the physical uplink control channel PUCCH, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the RI1, the RI2, and the PMI1 are fed back in a first feedback timeslot; the PMI2, the PMI3, and the CQI are fed back in a second feedback timeslot; and the PMI2, the PMI3, and the CQI are fed back in a third feedback timeslot; or the RI1, the RI2, the PMI1, and the PMI3 are fed back in a first feedback timeslot; the PMI2, the PMI4, and the CQI are fed back in a second feedback timeslot; and the PMI2, the PMI4, and the CQI are fed back in a third feedback timeslot.

Manner 2: The user equipment feeds back the channel state information to the base station by using the physical uplink control channel PUCCH, and the transmitter 302 feeds back the channel state information in one channel state information CSI feedback cycle of the physical uplink control channel PUCCH, where the CSI feedback cycle includes three feedback timeslots, where: the RI1 and the RI2 are fed back in a first feedback timeslot; the PMI1, the PMI3, and the CQI are fed back in a second feedback timeslot; and the CQI and the PMI2 are fed back in a third feedback timeslot; or the CSI feedback cycle includes three feedback timeslots, where: the RI1 and the RI2 are fed back in a first feedback timeslot; the PMI1, the PMI2, the PMI3, and the CQI are fed back in a second feedback timeslot; and the PMI1, the PMI2, the PMI3, and the CQI are fed back in a third feedback timeslot.

Manner 3: The channel state information further includes a precoding matrix type indicator PTI indicating a type of a precoding matrix, and when the precoding matrix is of a first type, the user equipment feeds back the channel state information to the base station by using a physical uplink control channel PUCCH, and the transmitter 302 feeds back the channel state information in one channel state information CSI feedback cycle of the physical uplink control channel PUCCH, where the CSI feedback cycle includes five feedback timeslots, and content fed back in the timeslots is shown as options in the following table:

|  | First feed-back timeslot | Second feed-back timeslot | Third feed-back timeslot | Fourth feed-back timeslot | Fifth feed-back timeslot | Sixth feed-back timeslot |
|---|---|---|---|---|---|---|
| Option 1 | RI1 + RI2 PTI = 0 | PMI1 + PMI2 | PMI3wb + CQIwb | PMI3wb + CQIwb | PMI3wb + CQIwb | RI1 + RI2 PTI = 0 |
| Option 2 | RI1 + RI2 PTI = 0 | PMI1 | PMI2 + PMI3wb + CQIwb | PMI2 + PMI3wb + CQIwb | PMI2 + PMI3wb + CQIwb | RI1 + RI2 PTI = 0 |

-continued

| | First feedback timeslot | Second feedback timeslot | Third feedback timeslot | Fourth feedback timeslot | Fifth feedback timeslot | Sixth feedback timeslot |
|---|---|---|---|---|---|---|
| Option 3 | RI1 PTI = 0 | PMI1 + RI2 | PMI2 + PMI3wb + CQIwb | PMI2 + PMI3wb + CQIwb | PMI2 + PMI3wb + CQIwb | RI1 PTI = 0 |
| Option 4 | RI2 PTI = 0 | PMI1 + RI1 | PMI2 + PMI3wb + CQIwb | PMI2 + PMI3wb + CQIwb | PMI2 + PMI3wb + CQIwb | RI2 PTI = 0 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the first type; and the feedback timeslots correspond to feedback moments within one CSI feedback cycle.

Manner 4: The channel state information further includes a precoding matrix type indicator PTI indicating a type of a precoding matrix, and when the precoding matrix is of a second type, the user equipment feeds back the channel state information to the base station by using a physical uplink control channel PUCCH, and the transmitter 302 feeds back the channel state information in one channel state information CSI feedback cycle of the physical uplink control channel PUCCH, where the CSI feedback cycle includes five feedback timeslots, and content fed back in the timeslots is shown as options in the following table:

| | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 1 | PMI1 + PMI2 + CQIwb | PMI3sb + CQIsb | PMI3sb + CQIsb | PMI3sb + CQIsb | RI1 + RI2 PTI = 1 |
| Option 2 | RI2 + PMI2 PTI = 1 | PMI1 + RI1 CQIwb | PMI3sb + CQIsb | PMI3sb + CQIsb | PMI3sb + CQIsb | RI2 + PMI2 PTI = 1 |
| Option 3 | RI2 + PMI2 PTI = 1 | PMI1 + RI1 CQIwb | PMI3sb + PMI4sb + CQIsb | PMI3sb + PMI4sb + CQIsb | PMI3sb + PMI4sb + CQIsb | RI2 + PMI2 PTI = 1 |
| Option 4 | RI2 PTI = 1 | PMI1 + RI1 CQIwb | PMI3sb + PMI2 + CQIsb | PMI3sb + PMI2 + CQIsb | PMI3sb + PMI2 + CQIsb | RI2 PTI = 1 |
| Option 5 | RI2 + RI1 PTI = 1 | PMI1 + CQIwb | PMI3sb + PMI2 + CQIsb | PMI3sb + PMI2 + CQIsb | PMI3sb + PMI2 + CQIsb | RI2 + RI1 PTI = 1 | where wb and sb represent that frequency domain granularities of a PMI and the CQI of the fed back channel state information are a wideband and a sub-band respectively, where wb corresponds to the wideband, and sb corresponds to the sub-band; PTI=1 represents that the type of the precoding matrix is the second type; and the feedback timeslots correspond to feedback moments within one CSI feedback cycle.

Figure 4:
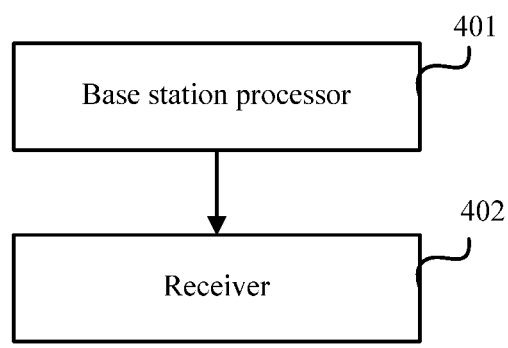
FIG. 4 is a schematic diagram of a structure of a base station according to an embodiment of the present application.

As shown in FIG. 4, an embodiment of the present application further provides a base station, where the base station includes: a base station processor 401, adapted to configure a first channel state information measurement resource and a second channel state information measurement resource, and send the first channel state information measurement resource and the second channel state information measurement resource to user equipment, so that the user equipment acquires first channel state information according to the first channel state information measurement resource, and acquires second channel state information according to the second channel state information measurement resource, where the first channel state information measurement resource and the second channel state information measurement resource respectively correspond to a first antenna port representing a horizontal dimension and a second antenna port representing a vertical dimension; and a receiver 402, configured to receive channel state information fed back by the user equipment, which includes: the receiver 402 is configured to receive the first channel state information that is fed back by the user equipment according to a first feedback mode, and the second channel state information that is fed back by the user equipment according to a second feedback mode, where the second feedback mode is different from the first feedback mode; or the receiver 402 is configured to receive third channel state information that is fed back by the user equipment according to a third feedback mode, where the third channel state information is obtained by the user equipment based on the first channel state information and the second channel state information.

The first channel state information includes first precoding matrix indicator information, the second channel state information includes second precoding matrix indicator information, and in the channel state information received by the receiver 402, a frequency domain feedback granularity of the first precoding matrix indicator information is less than or equal to a frequency domain feedback granularity of the second precoding matrix indicator information.

In addition, the receiver 402 is further configured to receive the channel state information according to a principle that a feedback cycle of the first channel state information is less than a feedback cycle of the second channel state information.

The first channel state information includes the first precoding matrix indicator information and first rank indicator information RI1, and the second channel state information including the second precoding matrix indicator information and second rank indicator information RI2, where the first precoding matrix indicator information further includes a first type of precoding matrix indicator PMI1 and a second type of precoding matrix indicator PMI2, and the second precoding matrix indicator information further includes a first type of precoding matrix indicator PMI3 and a second type of precoding matrix indicator PMI4; and the receiver 402 is configured to receive the first channel state information, the second channel state information, and a channel quality indicator CQI; or third precoding matrix indicator information, third rank indicator information, and a CQI, where: the third precoding matrix indicator information is obtained based on at least three of the PMI1, the PMI2, the PMI3, and the PMI4; the third rank indicator information is obtained based on the RI1 and the RI2; and the channel quality indicator CQI is obtained by the user equipment based on the first channel state information and the second channel state information.

Figure 5:
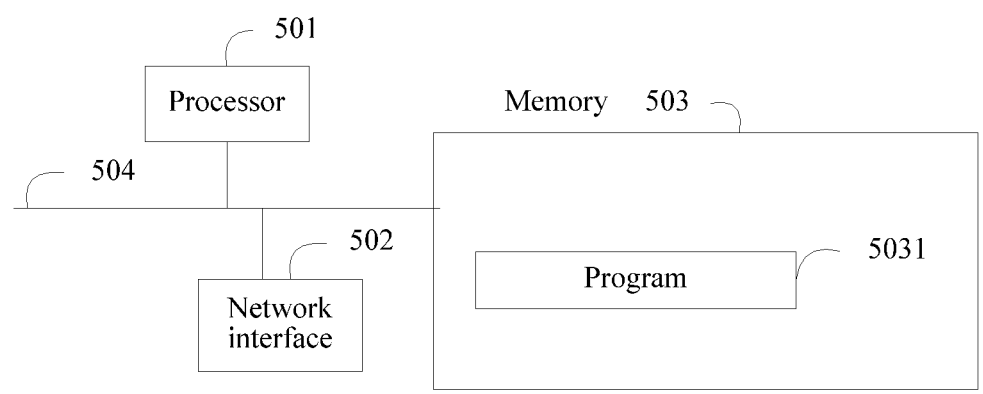
FIG. 5 is a schematic diagram of a structure of a feedback apparatus of channel state information according to an embodiment of the present application.

As shown in FIG. 5, the present application further provides another feedback apparatus of channel state information. The feedback apparatus may be the user equipment in the foregoing embodiment, and is configured to perform the feedback method of channel state information in the foregoing embodiments. The apparatus includes at least one the processor 501 (for example, a CPU), at least one network interface 502 or another communications interface, a memory 503, and at least one communications bus 504 that is configured to implement connection communication between these apparatuses. The processor 501 is configured to execute an executable module stored in the memory 503, for example, a computer program. The memory 503 may include a high-speed random access memory (RAM), and may further include a non-volatile memory, such as at least one magnetic disk memory. A communications connection between a system gateway and at least one another network element is implemented by using the at least one network interface 502 (which may be wired or wireless), where Internet, a wide area network, a local network, a metropolitan area network and the like may be used.

In some implementation manners, the memory in the apparatus provided in the present application stores a program 5031, and the program may be executed by the processor. This program includes: acquiring, by user equipment, first channel state information based on a first channel state information measurement resource configured by a base station, and acquiring second channel state information based on a second channel state information measurement resource configured by the base station, where the first channel state information measurement resource and the second channel state information measurement resource respectively correspond to a first antenna port representing a horizontal dimension and a second antenna port representing a vertical dimension; and feeding back, by the user equipment, channel state information to the base station, where a specific feedback manner for feeding back the channel state information may be: feeding back, by the user equipment, the first channel state information to the base station according to a first feedback mode, and feeding back the second channel state information to the base station according to a second feedback mode, where the second feedback mode is different from the first feedback mode; or feeding back, by the user equipment, third channel state information according to a third feedback mode, where the third channel state information is obtained by the user equipment based on the first channel state information and the second channel state information.

It should be noted that, in the foregoing embodiments, the descriptions of the embodiments have their respective focuses. For a part that is not described in detail in an embodiment, reference may be made to related descriptions in other embodiments. In this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

The foregoing embodiments are merely used to describe in detail the technical solutions of the present application. The descriptions of the foregoing embodiments are merely intended to help understand the method and core idea of the present application, and shall not be construed as a limitation to the present application. Any variation or replacement readily figured out by a person skilled in the art within the technical scope disclosed in the present application shall fall within the protection scope of the present application.

What is claimed is:

1. A user equipment, comprising:
a processor, configured to:
acquire first channel state information (CSI) based on a first CSI measurement resource configured by a base station, wherein the first CSI comprises a first type of precoding matrix indicator (PMI1) and a second type of precoding matrix indicator (PMI2) and a first rank indicator (RI1), and each of the PMI1, the PMI2, and the RI1 correspond to a first dimension of an array of transmitting antennas of the base station;
acquire second CSI based on a second CSI measurement resource configured by the base station, wherein the second CSI comprises a first type of precoding matrix indicator (PMI3) and a second type of precoding matrix indicator (PMI4) and a second rank indicator (RI2), each of the PMI3, the PMI4, and the RI2 correspond to a second dimension of the array of transmitting antennas of the base station, and the first dimension is perpendicular to the second dimension; and
obtain a channel quality indicator (CQI) based on the first CSI and the second CSI; and
a sender, configured to feed back CSI to the base station, which comprises:
the sender being configured to feed back the first CSI to the base station according to a first feedback mode, and feed back the second CSI to the base station according to a second feedback mode, wherein the second feedback mode is different from the first feedback mode; or
the sender being configured to feed back third CSI according to a third feedback mode, wherein the third CSI is obtained by the processor based on the first CSI and the second CSI;
wherein the third CSI comprises:
the first CSI, the second CSI, and the CQI; or
third precoding matrix indicator information, third rank indicator information, and the CQI, wherein the third precoding matrix indicator information is obtained based on at least three of the PMI1, the PMI2, the PMI3, and the PMI4, and the third rank indicator information is obtained based on the RI1 and the RI2;
wherein the user equipment feeds back the CSI to the base station using a physical uplink control channel (PUCCH), and the user equipment feeds back the CSI in a CSI feedback cycle of the PUCCH, wherein the CSI feedback cycle comprises a first feedback timeslot, a second feedback timeslot, and a third feedback timeslot; and
wherein the RI1 and the RI2 are fed back in the first feedback timeslot, the PMI3 and the CQI are fed back in the second feedback timeslot, and the CQI and the PMI2 are fed back in the third feedback timeslot.

2. The user equipment according to claim 1, wherein the PMI1 is further fed back in the second feedback timeslot.

3. The user equipment according to claim 1, wherein the PMI1 is further fed back in the first feedback timeslot; the PMI2 is further fed back in the second feedback timeslot; and the PMI3 is further fed back in the third feedback timeslot.

4. The user equipment according to claim 1, wherein the PMI1 and the PMI2 are further fed back in the second feedback timeslot, and the PMI1 and the PMI3 are further fed back in the third feedback timeslot.

5. An apparatus, comprising:
a processor, and a non-transitory memory coupled with the processor;
wherein the memory is configured to store instructions of a computer program which, when executed by the processor, and when the apparatus is comprised in a user equipment, cause the user equipment to:
  acquire first channel state information (CSI) based on a first CSI measurement resource configured by a base station, wherein the first CSI comprises a first type of precoding matrix indicator (PMI1) and a second type of precoding matrix indicator (PMI2) and a first rank indicator (RI1), and each of the PMI1, the PMI2, and the RI1 correspond to a first dimension of an array of transmitting antennas of the base station;
  acquire second CSI based on a second CSI measurement resource configured by the base station, and obtain a channel quality indicator (CQI) based on the first CSI and the second CSI, wherein the second CSI comprises a first type of precoding matrix indicator (PMI3) and a second type of precoding matrix indicator (PMI4) and a second rank indicator (RI2), each of the PMI3, the PMI4, and the RI2 correspond to a second dimension of the array of transmitting antennas of the base station, and the first dimension is perpendicular to the second dimension;
  obtain a channel quality indicator (CQI) based on the first CSI and the second CSI; and
  feed back CSI to the base station, wherein feeding back the CSI to the base station comprises:
    feeding back the first CSI to the base station according to a first feedback mode, and feeding back the second CSI to the base station according to a second feedback mode, wherein the second feedback mode is different from the first feedback mode; or
    feeding back third CSI according to a third feedback mode, wherein the third CSI is obtained by the processor based on the first CSI and the second CSI;
  wherein the third CSI comprises:
    the first CSI, the second CSI, and the CQI; or
    third precoding matrix indicator information, third rank indicator information, and the CQI, wherein the third precoding matrix indicator information is obtained based on at least three of the PMI1, the PMI2, the PMI3, and the PMI4, and the third rank indicator information is obtained based on the RI1 and the RI2;
  wherein the user equipment feeds back the CSI to the base station using a physical uplink control channel (PUCCH), and the user equipment feeds back the CSI in a CSI feedback cycle of the PUCCH, wherein the CSI feedback cycle comprises a first feedback timeslot, a second feedback timeslot, and a third feedback timeslot; and
  wherein the RI1, the RI2, the PMI1, and the PMI3 are fed back in the first feedback timeslot, the PMI2, the PMI4, and the CQI are fed back in the second feedback timeslot, and the PMI2, the PMI4, and the CQI are fed back in the third feedback timeslot.

6. A non-transitory computer-readable storage medium comprising instructions of a computer program which, when executed by a processor of a computer, cause the computer to:
  acquire first channel state information (CSI) based on a first CSI measurement resource configured by a base station, wherein the first CSI comprises a first type of precoding matrix indicator (PMI1) and a second type of precoding matrix indicator (PMI2) and a first rank indicator (RI1), and each of the PMI1, the PMI2, and the RI1 correspond to a first dimension of an array of transmitting antennas of the base station;
  acquire second CSI based on a second CSI measurement resource configured by the base station, and obtain a channel quality indicator (CQI) based on the first CSI and the second CSI, wherein the second CSI comprises a first type of precoding matrix indicator (PMI3) and a second type of precoding matrix indicator (PMI4) and a second rank indicator (RI2), each of the PMI3, the PMI4, and the RI2 correspond to a second dimension of the array of transmitting antennas of the base station, and the first dimension is perpendicular to the second dimension;
  obtain a channel quality indicator (CQI) based on the first CSI and the second CSI; and
  feed back CSI to the base station, wherein feeding back the CSI to the base station comprises:
    feeding back the first CSI to the base station according to a first feedback mode, and feeding back the second CSI to the base station according to a second feedback mode, wherein the second feedback mode is different from the first feedback mode; or
    feeding back third CSI according to a third feedback mode, wherein the third CSI is obtained by the processor based on the first CSI and the second CSI;
  wherein the third CSI comprises:
    the first CSI, the second CSI, and the CQI; or
    third precoding matrix indicator information, third rank indicator information, and the CQI, wherein the third precoding matrix indicator information is obtained based on at least three of the PMI1, the PMI2, the PMI3, and the PMI4, and the third rank indicator information is obtained based on the RI1 and the RI2;
  wherein the CSI further comprises a precoding matrix type indicator (PTI) indicating a type of a precoding matrix, and when the precoding matrix is of a first type, the CSI is fed back to the base station in a CSI feedback cycle of a physical uplink control channel (PUCCH), and the CSI feedback cycle comprises a first feedback timeslot, a second feedback timeslot, a third feedback timeslot, a fourth feedback timeslot, a fifth feedback timeslot, and a sixth feedback timeslot; and
  wherein the RI1 or the RI2 are fed back in the first feedback timeslot, the PMI1 is fed back in the second feedback timeslot, PMI3 is fed back in the third feedback timeslot, the PMI3 and the CQI are fed back in the fourth feedback timeslot, the PMI3 and the CQI are fed back in the fifth feedback timeslot, and the RI1 or the RI2 are fed back in the sixth feedback timeslot.

7. The non-transitory computer-readable storage medium according claim 6, wherein content fed back in the first feedback timeslot, the second feedback timeslot, the third feedback timeslot, the fourth feedback timeslot, the fifth feedback timeslot, and the sixth feedback timeslot is shown as at least one of options in the following table:

| | First feedback timeslot | Second feedback timeslot | Third feedback timeslot | Fourth feedback timeslot | Fifth feedback timeslot | Sixth feedback timeslot |
| --- | --- | --- | --- | --- | --- | --- |
| Option 1 | RI1 + RI2 PTI = 0 | PMI1 + PMI2 | PMI3wb + CQIwb | PMI3wb + CQIwb | PMI3wb + CQIwb | RI1 + RI2 PTI = 0 |

-continued

| | First feedback timeslot | Second feedback timeslot | Third feedback timeslot | Fourth feedback timeslot | Fifth feedback timeslot | Sixth feedback timeslot |
|---|---|---|---|---|---|---|
| Option 2 | RI1 + RI2 PTI = 0 | PMI1 | PMI2 + PMI3wb + CQIwb | PMI2 + PMI3wb + CQIwb | PMI2 + PMI3wb + CQIwb | RI1 + RI2 PTI = 0 |
| Option 3 | RI1 PTI = 0 | PMI1 + RI2 | PMI2 + PMI3wb + CQIwb | PMI2 + PMI3wb + CQIwb | PMI2 + PMI3wb + CQIwb | RI1 PTI = 0 |
| Option 4 | RI2 PTI = 0 | PMI1 + RI1 | PMI2 + PMI3wb + CQIwb | PMI2 + PMI3wb + CQIwb | PMI2 + PMI3wb + CQIwb | RI2 PTI = 0 | wherein wb indicates that a frequency domain granularity of an associated PMI or CQI of the fed back CSI is a wideband; PTI=0 indicates that the type of the precoding matrix is the first type; and the feedback timeslots correspond to feedback moments within a CSI feedback cycle.

8. The non-transitory computer-readable storage medium according claim 6, wherein content fed back in the first feedback timeslot, the second feedback timeslot, the third feedback timeslot, the fourth feedback timeslot, the fifth feedback timeslot, and the sixth feedback timeslot is shown as at least one of options in the following table:

| | First feedback timeslot | Second feedback timeslot | Third feedback timeslot | Fourth feedback timeslot | Fifth feedback timeslot | Sixth feedback timeslot |
|---|---|---|---|---|---|---|
| Option 1 | RI1 + RI2 PTI = 1 | PMI1 + PMI2 + CQIwb | PMI3sb + CQIsb | PMI3b + CQIsb | PMI3sb + CQIsb | RI1 + RI2 PTI = 1 |
| Option 2 | RI2 + PMI2 PTI = 1 | PMI1 + RI1 CQIwb | PMI3sb + CQIsb | PMI3sb + CQIsb | PMI3sb + CQIsb | RI2 + PMI2 PTI = 1 |
| Option 3 | RI2 + PMI2 PTI = 1 | PMI1 + RI1 CQIwb | PMI3sb + PMI4sb + CQIsb | PMI3sb + PMI4sb + CQIsb | PMI3sb + PMI4sb + CQIsb | RI2 + PMI2 PTI = 1 |
| Option 4 | RI2 PTI = 1 | PMI1 + RI1 | PMI3sb + PMI2 + CQIwb | PMI3sb + PMI2 + CQIsb | PMI3sb + PMI2 + CQIsb | RI2 PTI = 1 |
| Option 5 | RI2 + RI1 PTI = 1 | PMI1 + CQIwb | PMI3sb + PMI2 + CQIsb | PMI3sb + PMI2 + CQIsb | PMI3sb + PMI2 + CQIsb | RI2 + RI1 PTI = 1 | wherein sb indicates that a frequency domain granularity of an associated PMI or CQI of the fed back CSI is a sub-band, and wb indicates that a frequency domain granularity of an associated PMI or CQI of the fed back CSI is a wideband, PTI=1 indicates that the type of the precoding matrix is the second type, and the feedback timeslots correspond to feedback moments within a CSI feedback cycle.

* * * * *